United States Patent
Shinohara et al.

(10) Patent No.: US 8,871,039 B2
(45) Date of Patent: Oct. 28, 2014

(54) THICK WELDED STEEL PIPE EXCELLENT IN LOW TEMPERATURE TOUGHNESS, MANUFACTURING METHOD OF THICK WELDED STEEL PIPE EXCELLENT IN LOW TEMPERATURE TOUGHNESS, AND STEEL PLATE FOR MANUFACTURING THICK WELDED STEEL PIPE

(75) Inventors: Yasuhiro Shinohara, Tokyo (JP); Takuya Hara, Tokyo (JP); Naoki Doi, Tokyo (JP); Eiichi Yamashita, Tokyo (JP)

(73) Assignee: Nippon Steel & Sumitomo Metal Corporation, Tokyo (JP)

( * ) Notice: Subject to any disclaimer, the term of this patent is extended or adjusted under 35 U.S.C. 154(b) by 117 days.

(21) Appl. No.: 13/509,495

(22) PCT Filed: Sep. 13, 2011

(86) PCT No.: PCT/JP2011/070846
§ 371 (c)(1),
(2), (4) Date: May 11, 2012

(87) PCT Pub. No.: WO2012/036148
PCT Pub. Date: Mar. 22, 2012

(65) Prior Publication Data
US 2013/0037162 A1 Feb. 14, 2013

(30) Foreign Application Priority Data
Sep. 14, 2010 (JP) .................. 2010-205668

(51) Int. Cl.
*C22C 38/48* (2006.01)
*C22C 38/50* (2006.01)
(Continued)

(52) U.S. Cl.
CPC ............ *C21D 9/08* (2013.01); *C21D 2211/005* (2013.01); *C22C 38/16* (2013.01); *C22C 38/02* (2013.01); *C22C 38/005* (2013.01); *B23K*
(Continued)

(58) Field of Classification Search
CPC ........ C22C 38/04; C22C 38/12; C22C 38/14; C21D 2211/002; C21D 2211/005; C21D 9/14; C21D 9/08; C21D 8/0426; F16L 9/02; B23K 9/025
USPC ................. 148/320, 332–336, 909, 590–593, 148/519–521; 219/61; 138/171
See application file for complete search history.

(56) References Cited

U.S. PATENT DOCUMENTS
2010/0003535 A1 1/2010 Hara et al.

FOREIGN PATENT DOCUMENTS
EP 2 093 302 A1 8/2009
EP 2105513 A1 9/2009
(Continued)

OTHER PUBLICATIONS
Machine-English translation of Japanese patent 2008-121036, Ishikawa Nobuyuki et al., May 29, 2008.*
(Continued)

Primary Examiner — Deborah Yee
(74) Attorney, Agent, or Firm — Birch, Stewart, Kolasch & Birch, LLP

(57) ABSTRACT

The present invention provides a thick welded steel pipe excellent in low temperature toughness in which contents of Mn and Mo satisfy (Expression 1) below, Pcm obtained by (Expression 2) below is 0.16 to 0.19, and a metal structure of a base material steel plate consists of ferrite being 30 to 95% in an area ratio and a low temperature transformation structure, and in a metal structure of a coarse-grained HAZ, an area ratio of grain boundary ferrite is 1.5% or more, the total area ratio of the grain boundary ferrite and intragranular ferrite is not less than 11% nor more than 90%, an area ratio of MA is 10% or less, and its balance is composed of bainite.

$$1.2325 \le (0.85 \times [Mn] - [Mo]) \le 1.5215 \quad \text{(Expression 1)}$$

and $$Pcm = [C] + [Si]/30 + ([Mn] + [Cu] + [Cr])/20 + [Ni]/60 + [Mo]/15 + [V]/10 \quad \text{(Expression 2)}.$$

13 Claims, 6 Drawing Sheets

(51) Int. Cl.
*C21D 8/10* (2006.01)
*C22C 38/26* (2006.01)
*C22C 38/24* (2006.01)
*C21D 9/08* (2006.01)
*B23K 35/24* (2006.01)
*C22C 38/16* (2006.01)
*C22C 38/02* (2006.01)
*C22C 38/00* (2006.01)
*C22C 38/06* (2006.01)
*B23K 35/30* (2006.01)
*B23K 9/025* (2006.01)
*C22C 38/12* (2006.01)
*C22C 38/08* (2006.01)
*C22C 38/14* (2006.01)
*B23K 9/18* (2006.01)
*C22C 38/04* (2006.01)
*C21D 8/02* (2006.01)

(52) U.S. Cl.
CPC ..... 2203/04 (2013.01); *C22C 38/06* (2013.01); *C22C 38/002* (2013.01); *B23K 35/3053* (2013.01); *B23K 9/0253* (2013.01); *C22C 38/12* (2013.01); *C22C 38/08* (2013.01); *C22C 38/14* (2013.01); *B23K 35/3073* (2013.01); *B23K 9/186* (2013.01); *C22C 38/04* (2013.01); *C21D 8/02* (2013.01); *C22C 38/00* (2013.01); *C21D 2211/001* (2013.01); *B23K 2201/06* (2013.01); *C21D 8/105* (2013.01); *Y10S 148/909* (2013.01)

USPC .......... 148/332; 148/320; 148/333; 148/334; 148/335; 148/336; 148/909; 148/590; 148/591; 148/592; 148/593; 148/519; 148/520; 148/521; 219/61; 138/171

(56) References Cited

FOREIGN PATENT DOCUMENTS

| | | |
|---|---|---|
| JP | 2003-3233 A | 1/2003 |
| JP | 2005-336602 A | 12/2005 |
| JP | 2008-156754 A | 7/2008 |
| JP | 2008-163455 A | 7/2008 |
| JP | 2008-163456 A | 7/2008 |
| JP | 2009-149917 A | 7/2009 |
| JP | 2010-126730 A | 6/2010 |
| JP | 2010-222681 A | 10/2010 |
| WO | WO 2008/069289 A1 | 6/2008 |
| WO | WO 2008/069335 A1 | 6/2008 |

OTHER PUBLICATIONS

Steelmaking Practices and Their Influence on Properties, Metals Handbook, ASM International 1998, pp. 1-9.*

International Search Report issued in PCT/JP2011/070846, dated Nov. 22, 2011.

European Office Communication and Extended European Search Report issued in European Patent Application No. 11825150.3, dated Jun. 11, 2014.

* cited by examiner

THICK WELDED STEEL PIPE EXCELLENT IN LOW TEMPERATURE TOUGHNESS, MANUFACTURING METHOD OF THICK WELDED STEEL PIPE EXCELLENT IN LOW TEMPERATURE TOUGHNESS, AND STEEL PLATE FOR MANUFACTURING THICK WELDED STEEL PIPE

TECHNICAL FIELD

The present invention relates to a thick welded steel pipe excellent in low temperature toughness suitable for a line pipe for transporting crude oil and natural gas, or the like.

BACKGROUND ART

A steel pipe for a line pipe used for a pipeline that transports crude oil and natural gas for a long distance is required to achieve an increase in strength or thickness in terms of transport efficiency. For increasing the strength of steel, it is effective to utilize bainite, and high strength welded steel pipes with X80 of the American Petroleum Institute (API) specification and higher have been developed.

In the case when increasing the thickness of the steel pipe for a line pipe, a decrease in toughness of the weld portion, particularly, a weld heat affected zone (Heat Affected Zone ("HAZ" hereinafter)) becomes a problem. In the case when a thick plate is formed into a pipe shape by a UO process, and edge portions of the thick plate are jutted to each other to be seam welded, submerged arc welding with a large amount of heat input is employed. In the above submerged arc welding, toughness decreases due to coarsening of a structure of the HAZ and formation of a mixed structure of martensite and austenite (Martensite-Austenite constituent ("MA" hereinafter)) in particular.

Particularly, in the case when seam welding the thick plate by submerged arc welding from an inner surface and outer surface of the plate, the HAZ, which is welded first, in the proximity of a weld fusion line is reheated by heat input of the welding to be performed later. As above, in the case when the submerged arc welding is performed a plurality of times, there is sometimes a case that the coarse structure of the HAZ becomes an origin of fracture, and the toughness decreases markedly.

Further, in a high strength welded steel pipe with X80 or higher, bainite is utilized for increasing its strength, and thus a decrease in toughness of a base material and a HAZ becomes a problem. With respect to such a problem, for improving the toughness of the base material, there has been proposed a method of utilizing polygonal ferrite. Further, for improving the toughness of the HAZ, there has been proposed a method of utilizing intragranular transformation to make a structure fine (for example, Patent Documents 1 to 4). Further, there has been proposed a method of improving toughness of a HAZ by addition of B (for example, Patent Document 5).

PRIOR ART DOCUMENT

Patent Document

[Patent Document 1] Japanese Laid-open Patent Publication No. 2008-156754
[Patent Document 2] Japanese Laid-open Patent Publication No. 2008-163455
[Patent Document 3] Japanese Laid-open Patent Publication No. 2008-163456
[Patent Document 4] Japanese Laid-open Patent Publication No. 2009-149917
[Patent Document 5] International Publication WO-2008/069289A1

DISCLOSURE OF THE INVENTION

Problems to Be Solved by the Invention

In what is called general-purpose line pipes with X60 to 70, to secure low temperature toughness becomes a challenge. This is because the development of an oil field and a gas field progresses in a cold district such as the Arctic Circle, for example. In a cold district, the air temperature sometimes falls down to −40° C. or so, so that in consideration of variations, low temperature toughness at −60° C. is required for the steel pipe for a line pipe.

Further, when the steel pipe for a line pipe is thickened in terms of transport efficiency, heat input of seam welding has to be increased, and thus due to coarsening of the structure of the HAZ and formation of MA, the low temperature toughness decreases. Further, for thickening the steel pipe for a line pipe, the thickness of a base material steel plate has to be increased, so that a cooling speed after hot rolling in manufacturing the base material steel plate decreases. Accordingly, for achieving an increase in strength of the thick welded steel pipe by utilizing bainite, many alloys have to be added as compared with a thin high strength steel pipe.

However, when an alloy adding amount is increased, in the HAZ, MA to be an origin of fracture is formed easily. Further, when an alloy adding amount is increased, even though the strength of the base material steel plate is at the same level as that of a general-purpose welded steel pipe, the hardenability is increased equally to a high strength steel plate, and thus the hardness of the HAZ becomes equal to that of a high strength welded steel pipe. Accordingly, in the case when the general-purpose steel pipe for a line pipe is thickened, as compared with a thin high strength welded steel pipe, it becomes difficult to secure the low temperature toughness in the HAZ. Further, in the main specification of a line pipe, it is defined that the addition of B is allowed in line pipes with X100 and higher, and thus in what is called general-purpose line pipes with X60 to 70, the addition of B is not allowed.

The present invention has been made in consideration of such circumstances, and is to provide a thick welded steel pipe excellent in low temperature toughness having a thickness of 25 to 45 mm, a manufacturing method thereof, and a steel plate for manufacturing a thick welded steel pipe. Incidentally, the thick welded steel pipe of the present invention aims to have yield strength in the tensile direction corresponding to the circumferential direction being 400 to 635 MPa and Charpy absorbed energy in a weld heat affected zone at −60° C. being 60 J or more.

Means for Solving the Problems

The present inventor investigated, in order to improve low temperature toughness of a HAZ of a thick welded steel pipe having an alloy adding amount larger than that of a thin welded steel pipe, a method of controlling a structure of the HAZ according to components of a base material steel plate and welding conditions. As a result, it was learned that if among elements that increase hardenability, contents of Mn and Mo in particular are optimized and heat input of welding is made proper according to the thickness, the low temperature toughness of the HAZ can be secured. The gist of the present invention is as follows.

(1)
A thick welded steel pipe excellent in low temperature toughness having a thickness of 25 to 45 mm that is formed of a base material steel plate formed into a pipe shape being seam welded and has a coarse-grained HAZ, in which
the base material steel plate has a chemical composition containing, in mass %,
C: 0.03% to 0.085%,
Mn: 1.45% to 1.85%,
Ti: 0.005 to 0.020%,
Nb: 0.005 to 0.050%, and
O: 0.0005 to 0.005%, and
Si: limited to 0.15% or less,
Al: limited to 0.015% or less,
P: limited to 0.02% or less,
S: limited to 0.005% or less, and
Mo: limited to 0.20% or less, and
having the contents of Mn and Mo satisfying (Expression 1) below, a Pcm obtained by (Expression 2) below being 0.16 to 0.19, and a balance being composed of Fe and inevitable impurities,
a metal structure of the base material steel plate consists of ferrite being 30 to 95% in an area ratio and a low temperature transformation structure, and
in a metal structure of the coarse-grained HAZ, an area ratio of grain boundary ferrite is 1.5% or more, the total area ratio of the grain boundary ferrite and intragranular ferrite is not less than 11% nor more than 90%, an area ratio of MA is 10% or less, and its balance is composed of bainite.

$$1.2325 \leq (0.85 \times [Mn]-[Mo]) \leq 1.5215 \quad \text{(Expression 1)}$$

$$Pcm=[C]+[Si]/30+([Mn]+[Cu]+[Cr])/20+[Ni]/60+[Mo]/15+[V]/10 \quad \text{(Expression 2)}$$

In (Expression 2), [C], [Si], [Mn], [Cu], [Cr], [Ni], [Mo], and [V] denote the contents of C, Si, Mn, Cu, Cr, Ni, Mo, and V [mass %] respectively.

(2)
The thick welded steel pipe excellent in low temperature toughness according to (1), in which
a grain size of the ferrite in the metal structure of the base material steel plate is 2 to 15 μm.

(3)
The thick welded steel pipe excellent in low temperature toughness according to (1), in which
the bainite in the metal structure of the HAZ by welding consists of lath-shaped bainite and massive bainite, and an area ratio of the lath-shaped bainite is 20% or less.

(4)
The thick welded steel pipe excellent in low temperature toughness according to (1), in which
the base material steel plate further contains one or both of, in mass %,
Cu: 0.70% or less, and
Ni: 0.70% or less.

(5)
The thick welded steel pipe excellent in low temperature toughness according to (1), in which
the base material steel plate further contains one type or two types or more of, in mass %,
Cr: 1.00% or less,
V: 0.10% or less,
Zr: 0.050% or less, and
Ta: 0.050% or less.

(6)
The thick welded steel pipe excellent in low temperature toughness according to (1), in which
the base material steel plate further contains one type or two types or more of, in mass %,
Mg: 0.0100% or less,
Ca: 0.0050% or less, and
REM: 0.0050% or less.

(7)
The thick welded steel pipe excellent in low temperature toughness according to (1), in which
yield strength in a tensile direction corresponding to a circumferential direction of the thick welded steel pipe is 400 to 635 MPa, and Charpy absorbed energy of the coarse-grained HAZ at −60° C. is 60 J or more.

(8)
The thick welded steel pipe excellent in low temperature toughness according to (1), in which
a weld metal of the thick welded steel pipe contains, in mass %
C: 0.04% to 0.09%,
Si: 0.01% to 0.35%,
Mn: 1.5% to 2.0%,
Al: 0.002% to 0.030%,
Ti: 0.003% to 0.030%, and
O: 0.0005% to 0.030%, and
P: limited to 0.02% or less, and
S: limited to 0.005% or less, and further contains one type or two types or more of, in mass %,
Ni: 0.2% to 1.0%,
Cr+Mo+V: 0.2% to 1.0%, and
B: 0.0001 to 0.0050%, and a balance being composed of Fe and inevitable impurities.

(9)
A manufacturing method of a thick welded steel pipe excellent in low temperature toughness including:
forming a base material steel plate obtained in a manner that a steel having a chemical composition containing, in mass %,
C: 0.03% to 0.085%,
Mn: 1.45% to 1.85%,
Ti: 0.005 to 0.020%
Nb: 0.005 to 0.050%, and
O: 0.0005 to 0.005%, and
Si: limited to 0.15% or less,
Al: limited to 0.015% or less,
P: limited to 0.02% or less,
S: limited to 0.005% or less, and
Mo: limited to 0.20% or less, and
having the contents of Mn and Mo satisfying (Expression 1) below, a Pcm obtained by (Expression 2) below being 0.16 to 0.19, and a balance being composed of Fe and inevitable impurities is cast, an obtained steel billet is heated to 950 to 1150° C., is subjected to hot rolling at a finishing temperature of $Ar_3$ or higher, and is water-cooled down to 600° C. or lower, into a pipe shape; and
when edge portions of the base material steel plate being butted to be seam welded by submerged arc welding from an inner surface and outer surface of the base material steel plate, seam welding the edge portions of the base material steel plate such that heat input $J_I$ [kJ/cm] of the submerged arc welding from the inner surface, heat input $J_O$ [kJ/cm] of the submerged arc welding from the outer surface, and a plate thickness t [mm] satisfy relationships of (Expression 3) and (Expression 4) below.

$$1.2325 \leq (0.85 \times [Mn]-[Mo]) \leq 1.5215 \quad \text{(Expression 1)}$$

$$Pcm=[C]+[Si]/30+([Mn]+[Cu]+[Cr])/20+[Ni]/60+[Mo]/15+[V]/10 \quad \text{(Expression 2)}$$

in (Expression 2), [C], [Si], [Mn], [Cu], [Cr], [Ni], [Mo], and [V] denote the contents of C, Si, Mn, Cu, Cr, Ni, Mo, and V [mass %] respectively.

$$-2.3 \leq J_f - 1.75\,t \leq 27.8 \quad \text{(Expression 3)}$$

$$-9.6 \leq J_O - 2.42\,t \leq 20.6 \quad \text{(Expression 4)}$$

(10)

The manufacturing method of the thick welded steel pipe excellent in low temperature toughness according to (9), in which the hot rolling is performed at a reduction ratio at 900° C. or lower set as 2.0 or more.

(11)

The manufacturing method of the thick welded steel pipe excellent in low temperature toughness according to (9), in which a process of the forming the base material steel plate into a pipe shape is a UO process in which the base material steel plate is formed into a C shape, a U shape, and an O shape in order, the manufacturing method of the thick welded steel pipe excellent in low temperature toughness further including:

expanding the thick welded steel pipe obtained after the seam welding the edge portions of the base material steel plate.

(12)

A steel plate for a thick welded steel pipe used for manufacturing a thick welded steel pipe and having a thickness of 25 to 45 mm, the steel plate for the thick welded steel pipe including:

a chemical composition containing, in mass %,
C: 0.03% to 0.085%,
Mn: 1.45% to 1.85%,
Ti: 0.005 to 0.020%,
Nb: 0.005 to 0.050%, and
O: 0.0005 to 0.005%, and
Si: limited to 0.15% or less,
Al: limited to 0.015% or less,
P: limited to 0.02% or less,
S: limited to 0.005% or less, and
Mo: limited to 0.20% or less, and
having the contents of Mn and Mo satisfying (Expression 1) below, a Pcm obtained by (Expression 2) below being 0.16 to 0.19, and a balance being composed of Fe and inevitable impurities.

$$1.2325 \leq (0.85 \times [\text{Mn}] - [\text{Mo}]) \leq 1.5215 \quad \text{(Expression 1)}$$

$$\text{Pcm} = [\text{C}] + [\text{Si}]/30 + ([\text{Mn}] + [\text{Cu}] + [\text{Cr}])/20 + [\text{Ni}]/60 + [\text{Mo}]/15 + [\text{V}]/10 \quad \text{(Expression 2)}$$

In (Expression 2), [C], [Si], [Mn], [Cu], [Cr], [Ni], [Mo], and [V] denote the contents of C, Si, Mn, Cu, Cr, Ni, Mo, and V [mass %] respectively.

(13)

The steel plate for the thick welded steel pipe according to (12) in which, a grain size of ferrite in a metal structure is 2 to 15 µm.

Effect of the Invention

According to the present invention, it is possible to provide a thick welded steel pipe having a thickness of 25 to 45 mm and having excellent HAZ toughness at a low temperature of −60° C., and the present invention contributes to industry quite remarkably.

BEST MODE FOR CARRYING OUT THE INVENTION

The present inventor investigated as follows in order to obtain a thick welded steel pipe having excellent low temperature toughness. The present inventor first examined a structure of a weld heat affected zone (HAZ) of a thick welded steel pipe.

Figure 1:
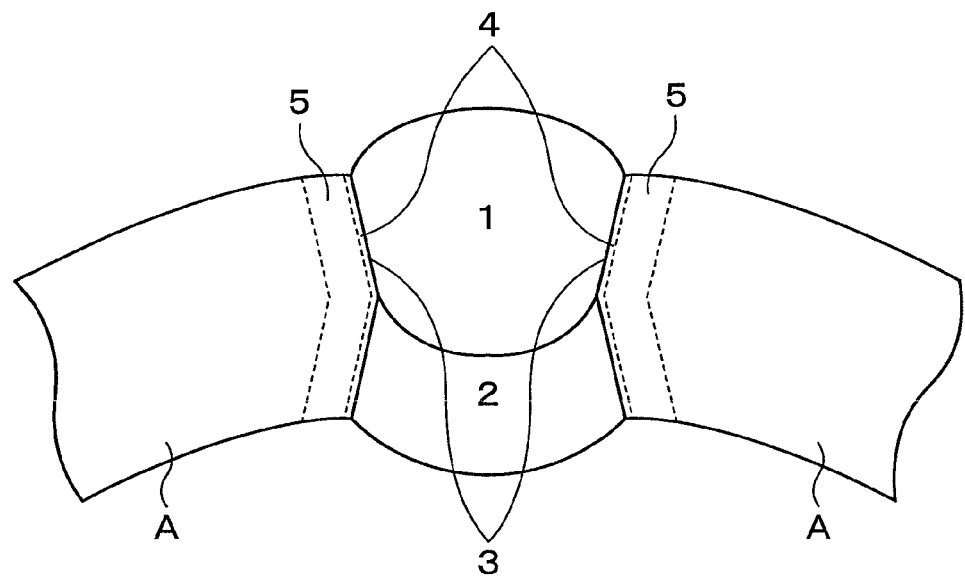
FIG. 1 is a schematic view for explaining a structure of a HAZ of a thick welded steel pipe, and is a view for explaining definition of a coarse-grained HAZ.

FIG. 1 is a schematic view for explaining the structure of the HAZ of the thick welded steel pipe, and is a view for explaining definition of a coarse-grained HAZ. The thick welded steel pipe is manufactured in a manner that, for example, edge portions of a base material steel plate A formed into a pipe shape by a UO process in which a steel plate is formed into a C shape, a U shape, and an O shape in order are seam welded to each other. FIG. 1 shows one portion of a cross section of the thick welded steel pipe including the HAZ.

In FIG. 1, the numeral 1 denotes an outer surface weld metal (weld metal) of the thick welded steel pipe, the numeral 2 denotes an inner surface weld metal (weld metal), the numeral 5 denotes the HAZ of the base material steel plate A, and the numeral 3 denotes a weld fusion line between the base material steel plate A and the weld metals 1 and 2. A boundary between the weld metals 1, 2 and the base material steel plate A that is not fused when being welded is the weld fusion line 3. A range of a predetermined distance from the weld fusion line 3 to the inside of the base material steel plate A along the circumferential direction of the thick welded steel pipe corresponds to the HAZ 5. In the HAZ 5, a region from the weld fusion line 3 up to 0.3 mm toward the base material steel plate A side corresponds to the coarse-grained HAZ 4.

As a result of the investigation, the present inventor found that in the HAZ 5 in the proximity of the weld fusion line 3, prior austenite grains are coarsened. Incidentally, the prior austenite grains are ones in which austenite grains generated in the seam welding are transformed into ferrite and a low temperature transformation structure. The grain size of the prior austenite grains is equal to that of the austenite grains generated in the seam welding. Particularly, in the coarse-grained HAZ 4 being the region from the weld fusion line 3 up to 0.3 mm toward the base material steel plate side of the HAZ 5, the grain size of the prior austenite grains became 100 μm or more, and the prior austenite grains with the large grain size of 200 to 300 μm were also observed. In the HAZ 5 (coarse-grained HAZ 4) ranging from the weld fusion line 3 up to 0.3 mm toward the base material steel plate A side, one to three of the prior austenite grains is/are contained.

In other words, in the present invention, the coarse-grained HAZ 4 is a region where the base material steel plate A is heated up to an austenite temperature range by being welded and where thereby the grain size of the prior austenite grains becomes 100 μm or more. The present inventors obtained a test piece from the HAZ 5 of the thick welded steel pipe and evaluated toughness at −60° C., and as a result, they learned that brittle fracture easily occurs in the coarse-grained HAZ 4.

Figure 2:
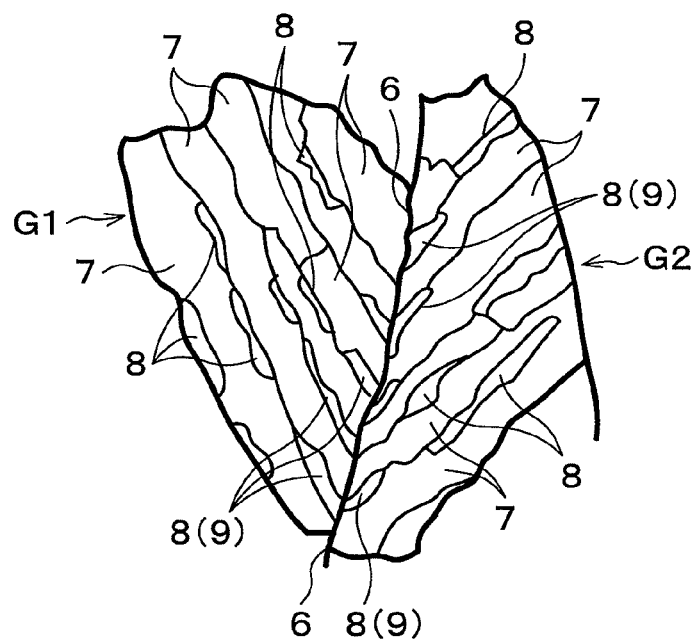
FIG. 2 is a schematic view for explaining a structure of the coarse-grained HAZ of the thick welded steel pipe, and is a view for explaining MA and lath-shaped bainite in the proximity of a prior austenite grain boundary.

FIG. 2 is a schematic view for explaining a structure of the coarse-grained HAZ 4 of the thick welded steel pipe, and is a view for explaining MA and lath-shaped bainite in the proximity of a prior austenite grains boundary. In FIG. 2, the numeral 6 denotes a prior austenite grain boundary, the numeral 7 denotes lath-shaped bainite, and the numeral denotes MA. FIG. 2 shows s state where in the coarse-grained HAZ 4, two prior austenite grains G1 and G2 come into contact with each other across the prior austenite grain boundary 6. As described above, in the coarse-grained HAZ 4, the austenite grains generated in the seam welding are transformed into the prior austenite grains after cooling. Then, between the prior austenite grains G2 and G2 adjacent to each other, the prior austenite grain boundary 6 appears as a trace. In the coarse-grained HAZ 4, the lath-shaped bainite 7 and the MA 8 are formed on the prior austenite grain boundary 6 and inside the prior austenite grains.

For achieving both the base material strength and toughness, a large number of hardenability elements such as Mn and Mo are added to the thick welded steel pipe. For this reason, in the coarse-grained HAZ 4, as shown in FIG. 2, the lath-shaped bainite 7 is easily formed from the prior austenite grain boundary 6.

The lath-shaped bainite 7 shown in FIG. 2 is a structure formed by cementite being formed in lath-shaped ferrite. In the case when a cooling speed of the coarse-grained heat affected zone 4 after the welding is slow, C is concentrated in the formed lath-shaped bainite 7, and thus as shown in FIG. 2, the MA 8 of martensite and austenite is formed.

The present inventor examined the correspondence of a distribution state of the MA 8 and an origin of brittle fracture in the coarse-grained heat affected zone 4 in detail. As a result, the present inventor ascertained that in the MA 8 shown in FIG. 2, MA 9 adjacent to the prior austenite grain boundary 6 becomes the origin of the fracture.

The lath-shaped bainite 7 formed toward the insides of the respective prior austenite grains G2 and G2 across the prior austenite grain boundary 6 significantly differ in crystal orientation from each other. For this reason, the prior austenite grain boundary 6 becomes a large angle tilt grain boundary. Accordingly, it is conceivable that the MA 9 adjacent to the prior austenite grain boundary 6 is likely to be the origin of the fracture. Note that the large angle tilt grain boundary is defined to be a grain boundary having an orientation difference of 15° or more, and can be determined by EBSP analysis.

On the other hand, it was found that the MA 8 formed in the lath-shaped bainite 7 in the inside of the prior austenite grain does not become the origin of the brittle fracture. This is conceivably because as shown in FIG. 2, the MA 8 and the MA 8 formed in the inside of the prior austenite grain are substantially the same in crystal orientation with each other, and the grain boundary existing between the MA 8 and the MA 8 does not become a large angle tilt grain boundary.

The present inventor further investigated and found that for obtaining a thick welded steel pipe having excellent low temperature toughness, it is necessary that in a metal structure of the coarse-grained HAZ 4, an area ratio of grain boundary ferrite should be 1.5% or more, the total area ratio of the grain boundary ferrite and intragranular ferrite should be not less than 11% nor more than 90%, an area ratio of the MA 8 should be 10% or less, and a balance of the metal structure should be bainite.

Figure 3:
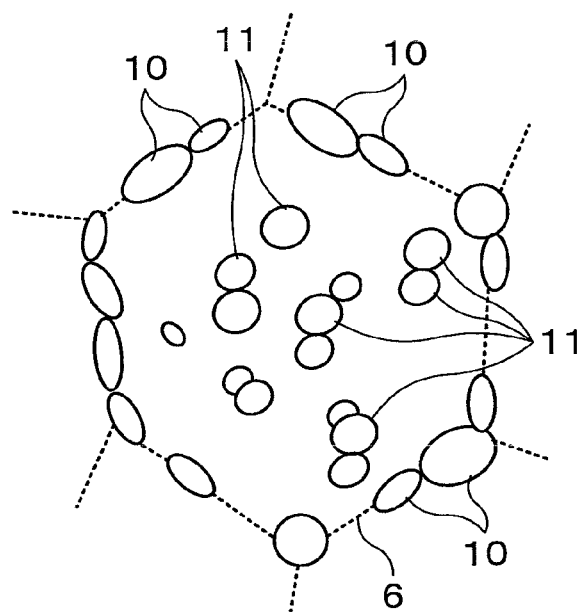
FIG. 3 is a schematic view for explaining a metal structure of the coarse-grained HAZ of the thick welded steel pipe of the present invention, and is a view for explaining grain boundary ferrite and intragranular ferrite in the coarse-grained HAZ.

FIG. 3 is a schematic view for explaining the metal structure of the coarse-grained HAZ 4 of the thick welded steel pipe of the present invention. As shown in FIG. 3, in the coarse-grained HAZ 4 of the thick welded steel pipe of the present invention, grain boundary ferrite 10 formed on the prior austenite grain boundary 6 and intragranular ferrite 11 formed inside the prior austenite grain are contained. The grain boundary ferrite 10 is ferrite formed in a manner that when the austenite grain formed by reheating at the time of welding is cooled, a nucleus formed at the position of the prior austenite grain boundary 6 grain-grow. The intragranular ferrite 11 is ferrite formed as a nucleus with a fine inclusion inside the prior austenite grain when the austenite grain is cooled.

The grain boundary ferrite 10 formed on the prior austenite grain boundary 6 in the coarse-grained HAZ 4 becomes resistance against crack propagation of the fracture. As described above, in the coarse-grained HAZ 4, the lath-shaped bainite 7 and the MA 9 are formed from the prior austenite grain boundary 6 toward the insides of the respective prior austenite grains G1 and G2 in a state where their crystal orientations are different from each other. As above, by the existence of the grain boundary ferrite 10, the grain boundary ferrite 10 gets into between the lath-shaped bainite 7 and the MA 9 different in crystal orientation from each other at the position of the prior austenite grain boundary 6. The above grain boundary ferrite 10 becomes the resistance against the crack propagation of the fracture, and thus low temperature toughness of the coarse-grained HAZ 4 is improved.

For effectively improving the low temperature toughness of the coarse-grained HAZ 4 at −60° C., the area ratio of the grain boundary ferrite 10 is required to be 1.5% or more. The area ratio of the grain boundary ferrite 10 is defined as an area ratio of the grain boundary ferrite 10 to appear in a cross-sectional structure of the coarse-grained HAZ 4 (an area ratio of ferrite in contact with the prior austenite grain boundary 6) as shown in FIG. 3. If the area ratio of the grain boundary ferrite 10 is less than 1.5%, the grain boundary ferrite 10 is not sufficient as the resistance against the propagation of the fracture, and thus the area ratio is required to be 1.5% or more.

Further, the intragranular ferrite 11 in the coarse-grained HAZ 4 that is formed of oxide inside the prior austenite grain is fine, becomes the resistance against the crack propagation of the fracture, and increases brittle fracture resistance to thereby improve the low temperature toughness. Further, with the formation of the intragranular ferrite 11, cementite precipitates, and thereby the formation of the coarse MA 8 is suppressed.

When the grain boundary ferrite 10 on the prior austenite grain boundary 6 and the intragranular ferrite 11 exist adequately, the thick welded steel pipe excellent in toughness at −60° C. is obtained thereby. In the thick welded steel pipe of the present invention, for securing the toughness at −60° C., the total area ratio of the grain boundary ferrite 10 and the intragranular ferrite 11 is required to be 11% or more in the metal structure of the coarse-grained HAZ 4. Note that it is desirable that an area ratio of the intragranular ferrite 11 in the metal structure of the coarse-grained HAZ 4 should be 0.5% or more.

As the area ratios of the grain boundary ferrite 10 and the intragranular ferrite 11 in the metal structure of the coarse-grained HAZ 4 increase, the low temperature toughness of the HAZ 5 is improved. However, when the total of the area ratios of the grain boundary ferrite 10 and the intragranular ferrite 11 exceeds 90%, the strength decreases. For this reason, in the present invention, the upper limit of the total of the area ratios of the grain boundary ferrite 10 and the intragranular ferrite 11 in the metal structure of the coarse-grained HAZ 4 is set to 90% or less, and is preferably set to 80% or less.

Further, the bainite contained in the metal structure of the coarse-grained HAZ 4 consists of the lath-shaped bainite 7 shown in FIG. 2 and massive bainite (not shown). The lath-shaped bainite 7 is a structure in which cementite is formed in lath-shaped ferrite. The lath-shaped bainite 7 and the lath-shaped bainite 7 adjacent to each other are formed in the same crystal orientation, so that the lath-shaped bainite 7 contained in the metal structure of the coarse-grained HAZ 4 becomes a coarse structure to thereby deteriorate the toughness. Accordingly, in the present invention, an area ratio of the lath-shaped bainite 7 in the coarse-grained HAZ 4 is preferably set to 20% or less. The massive bainite is also called granular bainite, and is a structure in which cementite is formed in massive ferrite.

Further, the present inventor investigated components of an alloy of the base material steel plate A in order to control the metal structure of the coarse-grained HAZ 4 such that the grain boundary ferrite 10 and the intragranular ferrite 11 are formed adequately and the MA 8 is suppressed.

The bainite and the MA 8 formed in the HAZ 5 decrease the toughness. For this reason, the components of the alloy of the base material steel plate A were investigated by paying attention to, among elements that improve the hardenability, Mn that is contained in large amounts and Mo that has an outstanding effect on the hardenability.

Mn is useful as an inexpensive element that improves the strength of the base material steel plate, and has a relatively small effect of suppressing the formation of ferrite in the HAZ 5. On the other hand, Mo is an element useful for improving the base material strength in minute amounts, but remarkably suppresses the formation of ferrite in the HAZ 5. For this reason, the content of Mo should be suppressed in order to secure the toughness of the HAZ 5.

The present inventor manufactured a plurality of base material steel plates having plate thicknesses of 25 to 45 mm different in contents of Mn and Mo in order to determine the contents of Mn and Mo. Then, the present inventor used each of the base material steel plates and manufactured a joint by submerged arc welding, and evaluated low temperature toughness. The submerged arc welding was performed layer by layer from a front surface and a rear surface. The low temperature toughness was evaluated in a manner to perform a Charpy impact test at −60° C. based on JIS Z 2242 and measure Charpy absorbed energy of a V-notch test piece. The V-notch test pieces were made based on JIS Z 3128.

Figure 4:
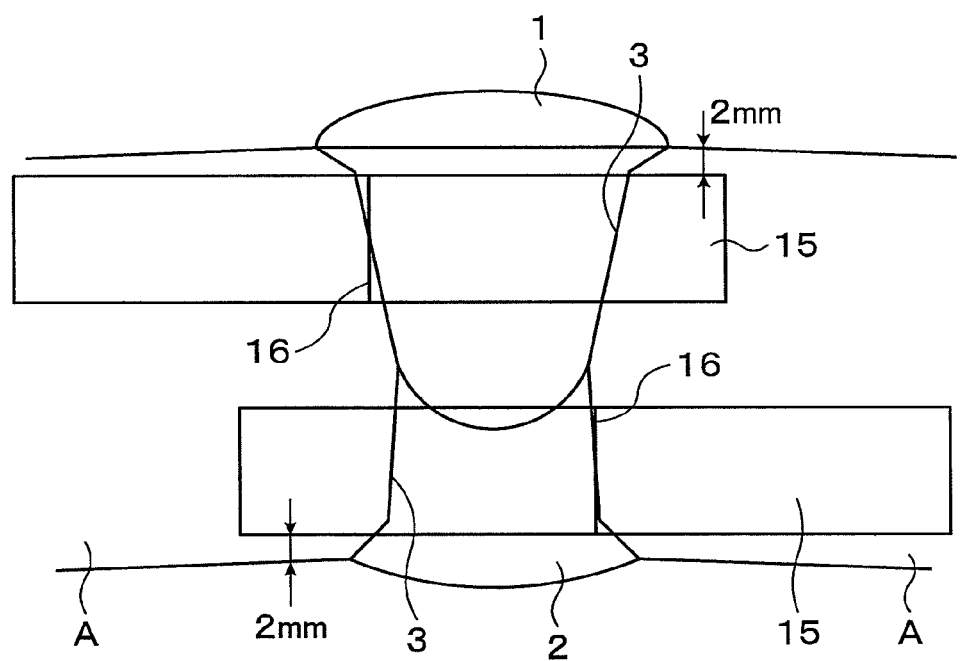
FIG. 4 is a view for explaining a position from which a V-notch test piece in which toughness of the coarse-grained HAZ is evaluated is obtained.

FIG. 4 is a view for explaining positions from which the V-notch test pieces are obtained. In FIG. 4, the numeral 1 denotes an outer surface weld metal (weld metal), the numeral 2 denotes an inner surface weld metal (weld metal), and the numeral 3 denotes a weld fusion line between a base material steel plate A and the weld metals 1 and 2. As shown in FIG. 4, the longitudinal direction of a V-notch test piece 15 and the width direction of the base material steel plate A (the circumferential direction of the thick welded steel pipe) are in agreement. The V-notch test piece 15 is cut out such that the middle of the V-notch test piece 15 is positioned at the weld fusion line 3. Thereby, a V-notch 16 formed in the middle of the V-notch test piece 15 crosses the weld fusion line 3. Further, the V-notch test pieces 15 are obtained respectively at a depth of 2 mm from the outer surface side and from the inner surface side of the base material steel plate A (the thick welded steel pipe).

Then, as a result of the Charpy impact test with the above V-notch test pieces 15, the present inventor found that in the case of the contents of Mn and Mo satisfying (Expression 1) below, the low temperature toughness of the HAZ 5, particularly, the coarse-grained HAZ 4 can be secured.

$$1.2325 \leq (0.85 \times [Mn] - [Mo]) \leq 1.5215 \quad \text{(Expression 1)}$$

In (Expression 1), [Mn] and [Mo] denote the contents of Mn and Mo [mass %] respectively.

Figure 5:
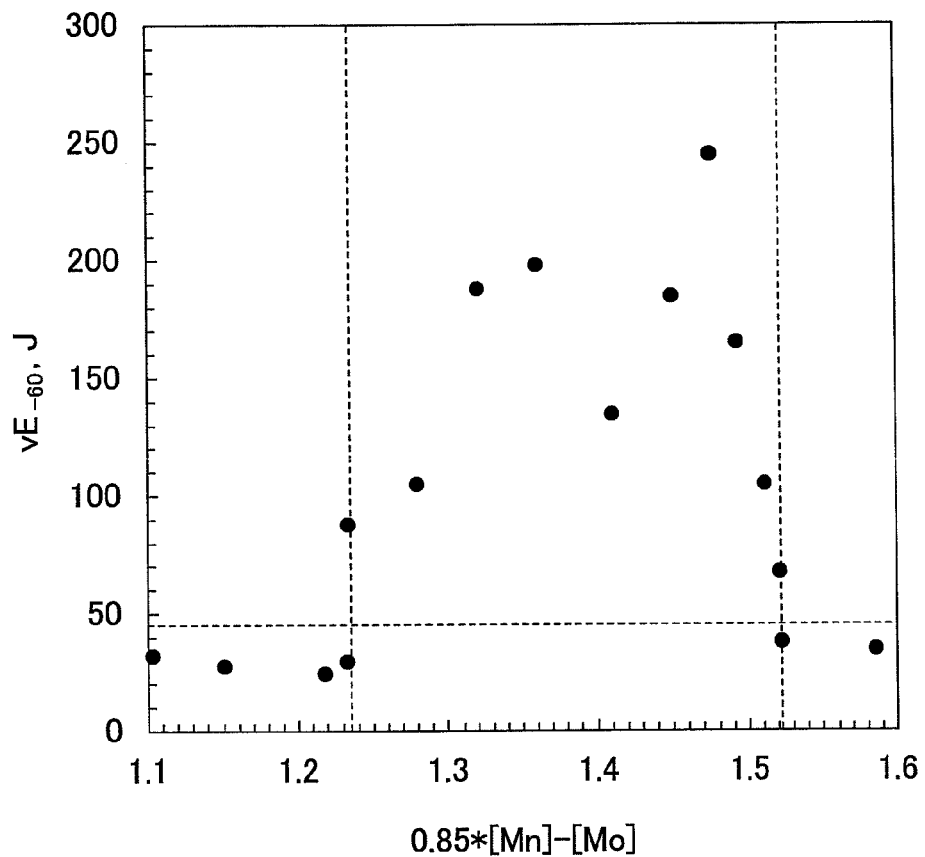
FIG. 5 is a graph showing a relationship between 0.85× [Mn]−[Mo] and Charpy absorbed energy in the coarse-grained HAZ at −60° C.

With the respective V-notch test pieces 15 made of respective steel types in which $(0.85 \times [Mn] - [Mo])$ is 1.1 to 1.6, the low temperature toughness of the coarse-grained HAZ 4 was examined. Results thereof in FIG. 5 were obtained. When $(0.85 \times [Mn] - [Mo])$ is less than the lower limit value of (Expression 1), the influence of Mo that suppresses the formation of the grain boundary ferrite 10 in the coarse-grained HAZ 4 is increased. On the other hand, when $(0.85 \times [Mn] - [Mo])$ exceeds the upper limit value of (Expression 1), the effect of improving the hardenability by Mn is increased. For this reason, when $(0.85 \times [Mn] - [Mo])$ falls out of the range of (Expression 1), the grain boundary ferrite 10 is not adequately formed in the coarse-grained HAZ 4 and the Charpy absorbed energy of the coarse-grained HAZ 4 at −60° C. becomes less than 60 J, resulting in that the low temperature toughness of the HAZ 5 decreases.

Further, oxide of Ti is suitable for the formation nucleus of the intragranular ferrite 11 in the coarse-grained HAZ 4. Accordingly, in the present invention, for making the area ratio of the intragranular ferrite in the metal structure of the coarse-grained HAZ 4 become 0.5% or more, the upper limit of the content of Al in the components of the alloy of the base material steel plate A is limited to 0.015% or less and Ti is contained 0.005 to 0.02%, and thereby fine Ti oxides are formed.

Further, Si and Al are elements that promote the formation of the MA 8. In the present invention, for making the area ratio of the MA 8 in the metal structure of the coarse-grained HAZ 4 become 10% or less, the upper limit of the content of Al in the components of the alloy of the base material steel plate A is limited to 0.015% or less and the content of Si is limited to 0.15% or less.

Further, when a Pcm, of the base material steel plate A, obtained by (Expression 2) below exceeds 0.19, the intragranular ferrite 11 is not adequately formed in the coarse-grained HAZ 4 to thereby make the low temperature toughness of the coarse-grained HAZ 4 insufficient. The Pcm is an index of weldability in general, but is a relation expression of alloy components that affect the hardenability and also affects a metal structure of the thick welded steel pipe. When the hardenability increases, the lath-shaped bainite 7 in the coarse-grained HAZ 4 is formed easily. When the Pcm exceeds 0.19, the area ratio of the lath-shaped bainite 7 in the metal structure of the coarse-grained HAZ 4 sometimes does not become 20% or less, and thus it is not preferable that the Pcm exceeds 0.19.

$$Pcm=[C]+[Si]/30+([Mn]+[Cu]+[Cr])/20+[Ni]/60+[Mo]/15+[V]/10 \quad \text{(Expression 2)}$$

In (Expression 2), [C], [Si], [Mn], [Cu], [Cr], [Ni], [Mo], and [V] denote the contents of C, Si, Mn, Cu, Cr, Ni, Mo, and V [mass %] respectively.

Note that when Mo whose content is limited and Si, Ni, Cu, Cr, and V that are selectively contained are not contained intentionally, the contents of the above elements are each set as zero in (Expression 1) and (Expression 2) above, and the calculation is performed.

"Metal Structure of Base Material Steel Plate"

Next, there will be explained the metal structure of the base material steel plate of the thick welded steel pipe of the present invention. In order that the strength of the thick welded steel pipe having a thickness of 25 to 45 mm of the present invention may become X60 grade or higher in the API specification, a low temperature transformation structure is required to be formed in the metal structure of the base material steel plate. The low temperature transformation structure is a generic name of martensite, bainite, and MA, in general. However, since the cooling speed after hot rolling is slow, in the base material steel plate of the present invention, martensite is not easily formed and the low temperature transformation structure is often composed of one or both of bainite and MA. On the other hand, when the metal structure of the base material steel plate is composed of only the low temperature transformation structure, for example, a bainite single phase, a slanted fracture surface is formed and the toughness deteriorates, and thus ferrite is required to be formed in the metal structure of the base material steel plate.

In the present invention, for securing the toughness at −60° C., the metal structure of the base material steel plate consists of ferrite being 30 to 95% in an area ratio and the low temperature transformation structure being the balance thereof. The area ratio of the ferrite is set to 30% or more in order to improve the toughness, and is set to 95% or less in order to secure the strength. MA of the low temperature transformation structure is a structure that adversely affects the toughness, and thus the area ratio of the MA is preferably set to 10% or less. However, crystal grains of the base material steel plate are finer than those of the HAZ, so that no problem is often cased by the adverse effect of the MA. As long as in the metal structure of the base material steel plate of the thick welded steel pipe, the area ratio of the ferrite is 50% or more and an area ratio of bainite is 50% or less, the balance between the strength and the toughness is further improved.

When the grain size of the ferrite contained in the metal structure of the base material steel plate is coarse, separation is performed remarkably, and the toughness of the base material steel plate sometimes deteriorates. Accordingly, for securing the toughness at −60° C., the grain size of the ferrite of the base material steel plate is preferably set to 15 μm or less. For improving the low temperature toughness, the grain size of the ferrite of the base material steel plate is desirably made fine. However, the thickness of the thick welded steel pipe of the present invention is 25 mm or more. In the steel plate having a plate thickness of 25 mm or more, there are limits to a reduction ratio and a cooling speed in hot rolling. Accordingly, in terms of manufacturing cost, the lower limit of the grain size of the ferrite in the base material steel plate is preferably 2 μm or more.

"Components of Base Material Steel Plate"

Next, the components of the base material steel plate of the thick welded steel pipe of the present invention will be explained. Note that the notation of % in the components means mass % unless otherwise noted.

The metal structure of the base material steel plate is significantly related to the hardenability, and is evaluated according to the Pcm obtained by (Expression 2) above from the contents of C, Si, Mn, Cu, Cr, Ni, Mo, and V [mass %] in the present invention. In the present invention, the Pcm is set to 0.16 to 0.19 in the components of the alloy of the base material steel plate for achieving both the strength and low temperature toughness of the base material steel plate and the HAZ of the thick welded steel pipe to satisfy the specification of X60 grade or higher.

C is an element that improves the strength of the steel. In the present invention, the content of C is limited to make a mixed structure of ferrite and bainite, and thereby the strength and the toughness of the base material steel plate are both achieved. When the content of C is less than 0.03%, the strength becomes insufficient. When the content of C exceeds 0.085%, the toughness deteriorates. For this reason, in the present invention, the optimum amount of C falls within a range of 0.03 to 0.085%.

Si is a deoxidizing element, but is an element that promotes the formation of the MA in the HAZ. When the content of Si exceeds 0.15%, the formation of the MA becomes remarkable, and thus the toughness deteriorates. For this reason, in the present invention, the content of Si is set to 0.15% or less. For suppressing the formation of the MA, the content of Si is preferably 0.10% or less.

Mn is used as a deoxidizer, and is required for securing the strength and the toughness of the base material steel plate. For promoting the formation of the bainite to thereby obtain the strength, Mn is required to be contained 1.45% or more. Preferably, Mn is contained 1.50% or more. On the other hand, for forming the grain boundary ferrite in the coarse-grained HAZ, in the present invention, the upper limit of the content of Mn is set to 1.85% or less. Preferably, the content of Mn is 1.80% or less.

P is an impurity element, and when the content of P exceeds 0.02%, the toughness of the base material steel plate deteriorates. Accordingly, the upper limit of the content of P is 0.02% or less.

S is an impurity element, and when the content of S exceeds 0.005%, coarse sulfide is formed to thereby deteriorate the toughness of the base material steel plate. Accordingly, the upper limit of the content of S is 0.005% or less.

Al is used as a deoxidizer, but in the present invention, Ti oxide is utilized as the formation nucleus of the intragranular ferrite, and thus the upper limit of the content of Al is limited to 0.015% or less. Further, Al promotes the formation of the MA in the coarse-grained HAZ, so that the upper limit of the content of Al is preferably limited to 0.010% or less.

Ti is an important element for finely dispersing oxides of Ti that effectively function as formation nuclei for intragranular transformation. For exhibiting the above effect, the content of Ti is set to 0.005% or more in the present invention. However, when the content of Ti exceeds 0.020%, coarse carbonitrides of Ti are formed, and thereby the toughness deteriorates. Accordingly, the upper limit of the content of Ti is set to 0.020% or less. The preferable upper limit of the content of Ti is 0.015% or less.

Nb is an important element for making grains of the structure of the base material steel plate fine, forming fine carbonitrides, and thereby securing the strength and the toughness. For exhibiting the above effect, Nb is required to be contained 0.005% or more. However, when the content of Nb exceeds 0.050%, coarse carbonitrides are formed, and thereby the toughness deteriorates. Accordingly, the upper limit of the content of Nb is set to 0.050% or less. Nb is an element that increases the hardenability of the steel, and for promoting the formation of the grain boundary ferrite in the coarse-grained HAZ, the upper limit of the content of Nb is preferably set to 0.025% or less.

Mo is an element that improves the hardenability, and is effective for achieving both the strength and the toughness of the base material steel plate having a thick thickness in particular. However, in the present invention, for forming the grain boundary ferrite in the coarse-grained HAZ, the upper limit of the content of Mo is limited to 0.20% or less. Further, for suppressing the formation of the MA in the coarse-grained HAZ, the content of Mo is preferably set to 0.15% or less.

O (oxygen) is an element to be contained in the steel inevitably. In the present invention, for forming fine Ti oxides contributing to the formation of the intragranular ferrite, the content of O of the base material steel plate is set to 0.0005 to 0.005%. That is, when the content of O is less than 0.0005%, a sufficient number of pieces of Ti oxides are not formed, and when the content of O exceeds 0.005%, coarse Ti oxides are formed, and thereby the toughness deteriorates. Note that the content of O of the base material steel plate is equal to the amount of oxygen to remain in the steel at the time of casting when oxides are formed.

Further, as an element that improves the strength and the toughness, one type or two types or more of Cu, Ni, Cr, V, Zr, and Ta may also be contained in the base material steel plate. Further, in the case when the contents of these elements are less than the preferable lower limits, no adverse effect is caused by the elements in particular.

Cu and Ni are effective elements that increase the strength without deteriorating the toughness, and for obtaining the above effect, the lower limits of the contents of Cu and Ni are preferably set to 0.05% or more. On the other hand, the upper limits of the contents of Cu and Ni are preferably set to 0.70% or less in order to suppress cracking at the time of steel billet heating and welding.

Cr, V, Zr, and Ta are elements that form carbide and nitrides and improve the strength of the steel by precipitation strengthening, and one type or two types or more of Cr, V, Zr, and Ta may also be contained. For increasing the strength effectively, the lower limit of the content of Cr is preferably set to 0.02% or more, the lower limit of the content of V is preferably set to 0.01% or more, and the lower limits of the contents of Zr and Ta are preferably both set to 0.0001% or more. On the other hand, when Cr is added excessively, there is sometimes a case that by the improvement of hardenability, the strength increases and the toughness deteriorates, so that the upper limit of the content of Cr is preferably set to 1.00% or less. Further, when V, Zr, and Ta are added excessively, there is sometimes a case that carbide and nitrides are coarsened and the toughness deteriorates, so that the upper limit of the content of V is preferably set to 0.10% or less, and the upper limits of the contents of Zr and Ta are preferably both set to 0.050% or less.

Furthermore, for controlling forms of inclusions to achieve the improvement of the toughness, one type or two types or more of Mg, Ca, and REM may also be contained in the base material steel plate. Further, in the case when the contents of these elements are also less than the preferable lower limits, no adverse effect is caused by the elements in particular.

Mg is an element that exhibits an effect for making oxides fine and controlling the form of sulfide. Particularly, fine oxides of Mg act as formation nuclei for intragranular transformation, and further exhibit an effect for suppressing coarsening of the grain size as pinning particles. For obtaining these effects, Mg is preferably contained 0.0001% or more. On the other hand, when the content of Mg exceeds 0.0100%, coarse oxides are formed to thereby deteriorate the toughness of the base material steel plate and the HAZ of the steel pipe, and thus the upper limit of the content of Mg is preferably set to 0.0100% or less.

Ca and REM are useful for controlling the form of sulfide, and are elements that form sulfide to thereby suppress the formation of MnS stretched in the rolling direction, and improves the property in the plate thickness direction of the base material steel plate, particularly, lamellar tear resistance. For obtaining the above effect, the lower limits of the contents of Ca and REM are preferably both set to 0.0001% or more. On the other hand, when the contents of Ca and REM exceed 0.0050%, coarse oxides are increased to thereby deteriorate the toughness, and thus the upper limits of the contents of Ca and REM are preferably set to 0.0050% or less.

Further, the thickness of the base material steel plate of the thick welded steel pipe of the present invention is 25 mm or more. For preventing the base material steel plate from being fractured due to internal pressure, when the base material steel plate used as a line pipe, the thickness of the base material steel plate is preferably set to 30 mm or more. On the other hand, when the thickness of the base material steel plate exceeds 45 mm, many alloys are required to be added for improving the strength, and further heat input of the welding is increased, and thus it becomes difficult to secure the strength and the low temperature toughness. Accordingly, the upper limit of the thickness of the base material steel plate of the thick welded steel pipe of the present invention is set to 45 mm or less.

The present invention is targeted at welded steel pipes with X60 to 70, being what is called general-purpose line pipes, and the yield strength in the tensile direction corresponding to the circumferential direction is preferably 635 MPa or less. For increasing the internal pressure of the line pipe, the yield strength in the tensile direction corresponding to the circumferential direction of the welded steel pipe is preferably set to 400 MPa or more. Note that normally, the direction corresponding to the circumferential direction of the steel pipe is the plate width direction of the base material steel plate. Further, the thick welded steel pipe of the present invention is supposed to be used in a cold district, and the Charpy absorbed energy of the HAZ at −60° C. is preferably 40 J or more, and is more preferably 80 J or more.

"Chemical Composition of Weld Metal"

Further, a chemical composition of the weld metal will be described.

C is an element extremely effective for improving strength of the weld metal, and C is preferably contained 0.04% or more. However, when the content of C is too much, weld cold cracking occurs easily, and there is sometimes a case that the HAZ at what is called a T-cross portion where the portion welded locally and the seam welding cross hardens and the toughness deteriorates. For this reason, the upper limit of the content of C of the weld metal is preferably set to 0.09% or less.

Si prevents the occurrence of a blowhole being a weld defect, so that Si is preferably contained 0.01% or more. On the other hand, when Si is added excessively, low temperature toughness of the weld metal decreases, and thus the upper limit of the content of Si is preferably set to 0.35% or less. Particularly, in the case when welding is performed a plurality of times, the low temperature toughness of the reheated weld metal sometimes deteriorates remarkably, and thus the upper limit of the content of Si is more preferably set to 0.30% or less.

Mn is an element effective for securing the balance between the strength and toughness of the weld metal, and the lower limit of the content of Mn is preferably set to 1.5% or more. However, when Mn is contained in large amounts, segregation is promoted, the low temperature toughness of the weld metal deteriorates, and it also becomes difficult to manufacture a welding wire to be used for the welding, and thus the upper limit of the content of Mn is preferably set to 2.0% or less.

Al is an element to be added in order that, when manufacturing the welding wire, refining and solidification may be performed successfully. For utilizing fine Ti-based oxides to suppress coarsening of the grain size of the weld metal, the content of Al of the weld metal is preferably set to 0.002% or more. However, Al is an element that promotes the formation of the MA, so that the preferable upper limit of the content of Al of the weld metal is 0.030% or less.

Ti forms fine oxides to be formation nuclei for intragranular transformation to contribute to making the grain size of the weld metal fine. Ti is preferably contained 0.003% or more. On the other hand, when Ti is contained in large amounts, a large amount of carbide of Ti is formed, and thereby the low temperature toughness is sometimes deteriorated. Accordingly, the upper limit of the content of Ti is preferably set to 0.030%.

O is an impurity, and the amount of oxygen to remain finally in the weld metal is often 0.0005% or more. However, in the case when O exceeding 0.030% remains in the weld metal, coarse oxides are formed, and thus the toughness of the weld metal sometimes decreases. Accordingly, the upper limit of the content of O in the weld metal is preferably set to 0.030% or less. Normally, the content of O in the weld metal is adjusted by flux to be used for the submerged arc welding.

P and S are impurities, and for decreasing the deterioration of the low temperature toughness of the weld metal and cold cracking susceptibility, the upper limit of the content of P is preferably set to 0.02% or less, and the upper limit of the content of S is preferably set to 0.005% or less. Note that in terms of the low temperature toughness, the more preferable upper limit of the content of P is 0.01% or less.

The weld metal preferably further contains one type or two types or more of Ni, Cr, Mo, and V selectively.

Ni is an element that increases the hardenability of the weld metal to secure the strength and further improves the low temperature toughness. For obtaining an effect of Ni, Ni being 0.2% or more is preferably contained. On the other hand, when the content of Ni is too much, hot cracking sometimes occurs, and thus the upper limit of the amount of Ni is preferably set to 1.0% or less.

Cr, Mo, and V are all elements that increase the hardenability, and for increasing the strength of the weld metal, one type or two types or more of these elements is/are preferably contained 0.2% or more in total. On the other hand, when Cr, Mo, and V are contained excessively, the hardenability of the weld metal is too increased, and thus the low temperature toughness sometimes deteriorates. Accordingly, the upper limit of the total content of one type or two types or more of Cr, Mo, and V is preferably set to 1.0% or less.

The weld metal may also contain B for further increasing the hardenability. B is an element that remarkably increases the hardenability of the weld metal, and for securing the strength, B is preferably contained 0.0001% or more. On the other hand, when B is contained excessively, the toughness of the weld metal sometimes deteriorates, and thus the upper limit of the content of B is preferably set to 0.0050% or less.

The weld metal sometimes contains elements other than the above elements, which are, for example, Nb being an essential element of the base material steel plate, Cu, Zr, Ta, Mg, Ca, and REM that are added to the base material selectively, and so on, due to dilution from the base material steel plate. Further, the weld metal sometimes contains the elements of Zr, Nb, Mg, and the like that are added according to need in order that refining and solidification of the welding wire may be performed successfully. These elements are impurities to be contained inevitably.

"Manufacturing Method of Thick Welded Steel Pipe"

Next, a manufacturing method of the thick welded steel pipe of the present invention will be explained. First, a manufacturing method of the base material steel plate will be explained.

A steel adjusted to contain the components of the above-described base material steel plate is melted, and then is cast, and a steel billet is obtained. The casting is allowed to be performed by an ordinary method, but in terms of productivity, continuous casting is preferable. The steel billet is heated for hot rolling.

In the hot rolling, the steel billet is heated to a temperature range where the structure of the steel is transformed into austenite. In the chemical components of the base material steel plate in the present invention, $Ac_3$ at which the structure of the steel is transformed into austenite does not exceed 950° C., so that the heating temperature of the hot rolling is set to 950° C. or higher. The upper limit of the heating temperature of the steel billet is set to 1150° C. or lower in order to make the crystal grains of the base material steel plate fine. Further, for promoting ferrite transformation after the hot rolling, it is preferable to perform the hot rolling at low temperatures and increase a distortion amount to be accumulated. Accordingly, the heating temperature of the hot rolling is preferably decreased, and the more preferable upper limit of the heating temperature of the steel billet is 1100° C. or lower.

The hot rolling may also be started immediately after the steel billet is taken out of a heating furnace. Accordingly, the starting temperature of the rolling is not defined in particular.

The finishing temperature of the hot rolling is set to $Ac_3$ or higher because the hot rolling is performed at a temperature at which the structure of the steel becomes an austenite single phase or higher. When the hot rolling is performed at the finishing temperature lower than $Ac_3$, worked ferrite is formed, and thereby the toughness decreases, or an aggregate structure in which specified orientations are collected is formed, resulting in that anisotropy of the material of the base material steel plate sometimes becomes noticeable.

In terms of making the crystal grains of the base material steel plate fine, a reduction ratio of the hot rolling at temperatures in excess of 900° C. corresponding to a temperature range where recrystallization is promoted (recrystallization temperature range) is preferable set to 2.0 or more. The reduction ratio in the recrystallization temperature range is the ratio of the thickness of the steel billet and the plate thickness obtained after the final rolling at temperatures in excess of 900° C.

When the reduction ratio at low temperatures is increased in the hot rolling being performed, the crystal grains can be made fine. Particularly, temperatures of 900° C. or lower correspond to a temperature range where recrystallization is suppressed (non-recrystallization range), and for promoting ferrite transformation after water cooling, the reduction ratio of the hot rolling at 900° C. or lower is preferably increased. For making the grain size of the ferrite of the base material steel plate become 15 μm or less, the reduction ratio of the hot rolling at 900° C. or lower is preferably set to 2.5 or more. For further making the grain size of the ferrite fine, the reduction ratio of the hot rolling at 900° C. or lower is preferably set to 3.0 or more. The reduction ratio at 900° C. or lower is the ratio of the plate thickness before the rolling starts at 900° C. or lower divided by the plate thickness after the hot rolling ends.

Note that the plate thickness after the final rolling at temperatures in excess of 900° C. and the plate thickness before the rolling starts at 900° C. or lower become the same numeric value eventually. Further, the upper limits of the reduction ratios of the hot rolling in the non-recrystallization range and the hot rolling in the recrystallization range are not defined, but when considering the plate thickness of the steel billet before the rolling and the plate thickness of the steel plate after the rolling, the upper limits are 12.0 or less normally.

After the hot rolling ends, water cooling is performed in order to transform the structure of the base material steel plate into a mixed structure of ferrite and bainite. When the stop temperature of the water cooling is too high, pearlite is formed, and thus the stop temperature of the water cooling is set to 600° C. or lower. It is also possible that the lower limit of the water cooling stop temperature is not defined and the base material steel plate is cooled down to room temperature, but when hydrogen defects are considered, the lower limit of the water cooling stop temperature is preferably set to 150° C. or higher.

The base material steel plate obtained as above is formed into a pipe shape, edge portions (seams) of the pipe-shaped base material steel plate are butted to be seam welded by submerged arc welding from the inner surface and the outer surface, and the thick welded steel pipe is formed. In the present invention, a UOE process, in which the base material steel plate is press-formed into a C shape, a U shape, and an o shape in order (a UO process), and the edge portions of the base material steel plate are butted to be seam welded by the submerged arc welding, and then the obtained thick welded steel pipe is expanded by an expander or the like, is preferably employed.

In the manufacturing method of the thick welded steel pipe of the present invention, the process in which the edge portions of the base material steel plate are butted to be submerged arc welded is preferably a process in which the edge portions of the base material steel plate are butted, the submerged arc welding is performed from the inner surface, and then the submerged arc welding is performed from the outer surface.

The heat input of the submerged arc welding significantly affects the structure of the coarse-grained HAZ. Further, in the present invention, the cooling speed after the welding is set slower than usual, so that the heat input of the submerged arc welding is set to be higher intentionally.

The present inventor investigated a relationship between the heat input of the submerged arc welding and the thickness of the base material steel plate in terms of the fact that the cooling speed of the coarse-grained HAZ after the welding affects the formation of the ferrite and MA toward the prior austenite grain boundary in the coarse-grained HAZ. The present inventor used the base material steel plates each having a plate thickness of 25 to 40 mm, performed the submerged arc welding from the front surface and the rear surface on each of the base material steel plates layer by layer, and manufactured a plurality of joints. Then, the present inventor observed the structure of a coarse-grained HAZ of each of the plurality of joints and examined the relationship between the heat input of the submerged arc welding, the plate thickness of the base material steel plate, and the structure of the coarse-grained HAZ.

The present inventor set the heat input of the side to be welded first to inner surface weld heat input $J_I$ [J/cm], set the heat input of the side to be welded later to outer surface weld heat input $J_O$ [J/cm], and organized the relationship between the inner surface weld heat input $J_I$ [J/cm], the outer surface weld heat input $J_O$ [J/cm], and a plate thickness t, and then evaluated the influence on the structure of the coarse-grained HAZ. As a result, the present inventor learned that the relationships of (Expression 3) and (Expression 4) below are required to be satisfied for securing the grain boundary ferrite in the coarse-grained HAZ and suppressing the formation of the MA.

$$-2.3 \leq J_I - 1.75\ t \leq 27.8 \quad \text{(Expression 3)}$$

$$-9.6 \leq J_O - 2.42\ t \leq 20.6 \quad \text{(Expression 4)}$$

The reason why (Expression 3) and (Expression 4) above are required for controlling the structure of the coarse-grained HAZ is conceivable as follows.

When ($J_I$−1.75 t) and/or ($J_O$−2.42 t) become/becomes small, the cooling speed after the welding becomes fast. When ($J_I$−1.75 t) and/or ($J_O$−2.42 t) are/is less than the above-described range/ranges, it is not possible to secure the grain boundary ferrite. On the other hand, when ($J_I$−1.75 t) and/or ($J_O$−2.42 t) become/becomes large, the cooling speed after the welding becomes slow. When ($J_I$−1.75 t) and/or ($J_O$−2.42 t) exceed/exceeds the above-described range/ranges, the MA is formed easily and thus it becomes impossible to suppress the formation of the MA.

When ($J_I$−1.75 t) falls within the range of (Expression 3) above and ($J_O$−2.42 t) falls within the range of (Expression 4) above, the grain boundary ferrite and the intragranular ferrite in the metal structure of the coarse-grained HAZ are secured and the formation of the MA is suppressed.

That is, for securing the grain boundary ferrite being 0.1% or more in an area ratio in the metal structure of the coarse-grained HAZ, ($J_I$−1.75 t) is required to be set to −2.3 or more, and ($J_O$−2.42 t) is required to be set to −9.6 or more. Further, for making the area ratio of the MA become 10% or less in the metal structure of the coarse-grained HAZ, ($J_I$−1.75 t) is required to be set to 27.8 or less, and ($J_O$−2.42 t) is required to be set to 20.6 or less.

Further, the welding wire preferably contains the following components for making the chemical composition of the weld metal fall within the above-described range in consideration of the dilution of the components by the base material steel plate. That is, the welding wire has a chemical composition containing, in mass %, C: 0.01 to 0.12%, Si: 0.05 to 0.5%, Mn: 1.0 to 2.5%, Ni: 2.0 to 8.5%, and further containing Al: 0.1% or less and Ti: 0.05% or less, and a balance being composed of Fe and inevitable impurities. Further, the welding wire may contain B: 0.001 to 0.005%, and may also contain one type or two types or more of Cr, Mo, and V in a range of Cr+Mo+V: 1.0 to 5.0%.

Further, in the present invention, for improving the circularity of the thick welded steel pipe, the thick welded steel pipe obtained after the base material steel plate being seam welded is preferably expanded. In the case of improving the circularity of the thick welded steel pipe by expansion, the thick welded steel pipe is required to be deformed up to a plastic region thereof, so that an expansion ratio is preferably set to 0.7% or more. The expansion ratio is one in which the value obtained by dividing a difference between the outer circumferential length of the thick welded steel pipe after being expanded and the outer circumferential length of the thick welded steel pipe before being expanded by the outer circumferential length of the thick welded steel pipe before being expanded is expressed in percentage. When the expansion ratio exceeds 2%, the toughness of both the base material steel plate and the weld metal deteriorate due to the plastic deformation. Accordingly, the expansion ratio is preferably set to 0.7 to 2.0%.

EXAMPLE

Hereinafter, the effect of the present invention will be explained concretely according to examples.

Steels of steel types A to R having chemical components in Table 1 were cast to obtain steel billets each having a thickness of 240 mm. The steel types A to M are present invention examples, and the steel types N to R are comparative examples. Note that in Table 1, (Expression 1) is 0.85×[Mn]–[Mo] ([Mn] and [Mo] denote the contents of Mn and Mo [mass %]). Each blank space means that no element is added intentionally. Each underline means that the value is out of the range of the present invention.

Table 2, the hot rolling was performed at the finishing temperature of $Ac_3$ or higher. Water cooling started at the start temperature of not higher than the temperature immediately after the end of the hot rolling nor lower than 750° C., and each of the steel billets was water-cooled down to the water cooling stop temperature shown in Table 2, and each of base material steel plates was obtained. Note that plate thicknesses of the base material steel plates after the hot rolling in the recrystallization temperature range of temperatures in excess of 900° C. were 25 to 45 mm. Note that in Table 2, the reduction ratio is the ratio of the plate thickness before the hot rolling at 900° C. or lower and the plate thickness after the hot

TABLE 1

| MANUFAC-TUREING No. | COMPOSITION(mass %) | | | | | | | | | | |
|---|---|---|---|---|---|---|---|---|---|---|---|
| | C | Si | Mn | P | S | Al | Ti | Nb | Mo | O | Cu |
| A | 0.051 | 0.06 | 1.82 | 0.009 | 0.0020 | 0.005 | 0.012 | 0.012 | 0.14 | 0.0040 | 0.27 |
| B | 0.061 | 0.05 | 1.64 | 0.007 | 0.0020 | 0.009 | 0.010 | 0.010 | | 0.0035 | 0.26 |
| C | 0.032 | 0.07 | 1.84 | 0.007 | 0.0018 | 0.015 | 0.007 | 0.038 | 0.20 | 0.0048 | |
| D | 0.048 | 0.06 | 1.78 | 0.008 | 0.0011 | 0.011 | 0.014 | 0.022 | | 0.0012 | 0.10 |
| E | 0.061 | 0.04 | 1.65 | 0.012 | 0.0032 | 0.006 | 0.019 | 0.048 | | 0.0018 | 0.50 |
| F | 0.084 | 0.05 | 1.46 | 0.018 | 0.0020 | 0.003 | 0.012 | 0.016 | | 0.0031 | 0.25 |
| G | 0.063 | 0.06 | 1.84 | 0.009 | 0.0035 | 0.005 | 0.011 | 0.012 | 0.06 | 0.0029 | |
| H | 0.055 | 0.06 | 1.75 | 0.009 | 0.0012 | 0.006 | 0.015 | 0.021 | | 0.0024 | 0.20 |
| I | 0.058 | 0.08 | 1.75 | 0.008 | 0.0005 | 0.006 | 0.009 | 0.006 | 0.12 | 0.0036 | |
| J | 0.050 | 0.06 | 1.68 | 0.010 | 0.0022 | 0.006 | 0.012 | 0.013 | | 0.0035 | 0.40 |
| K | 0.061 | 0.05 | 1.65 | 0.008 | 0.0013 | 0.008 | 0.011 | 0.012 | 0.08 | 0.0035 | |
| L | 0.066 | 0.06 | 1.83 | 0.009 | 0.0020 | 0.004 | 0.011 | 0.013 | 0.17 | 0.0038 | |
| M | 0.071 | 0.09 | 1.52 | 0.007 | 0.0048 | 0.002 | 0.012 | 0.021 | | 0.0032 | 0.25 |
| N | 0.060 | <u>0.18</u> | 1.78 | 0.009 | 0.0018 | 0.013 | 0.014 | 0.030 | 0.18 | 0.0026 | |
| O | 0.085 | 0.06 | 1.55 | 0.010 | 0.0020 | 0.015 | 0.013 | 0.020 | | 0.0027 | 0.60 |
| P | 0.072 | 0.06 | 1.84 | 0.010 | 0.0018 | 0.007 | 0.012 | 0.040 | 0.01 | 0.0038 | |
| Q | 0.061 | 0.08 | 1.67 | 0.010 | 0.0025 | 0.005 | 0.010 | 0.007 | 0.20 | 0.0035 | |
| R | 0.051 | 0.08 | 1.84 | 0.018 | 0.0048 | <u>0.017</u> | 0.010 | 0.015 | 0.09 | 0.0045 | |

| MANUFAC-TUREING No. | COMPOSITION(mass %) | | | EXPRESSION 1 | Pcm | NOTE |
|---|---|---|---|---|---|---|
| | Ni | Cr, V, Zr, Ta | OTHER | | | |
| A | 0.27 | | Mg: 0.0022 | 1.4070 | 0.171 | PRESENT |
| B | 0.26 | Cr: 0.23 | | 1.3940 | 0.174 | INVENTION |
| C | | Cr: 0.28, V: 0.070 | Ca: 0.0006, REM: 0.0010 | 1.3640 | 0.161 | EXAMPLE |
| D | 0.10 | Cr: 0.30, Ta: 0.0003 | | 1.5130 | 0.161 | |
| E | 0.50 | | Mg: 0.0016 | 1.4025 | 0.178 | |
| F | | Cr: 0.22 | | 1.2410 | 0.186 | |
| G | | | | 1.5040 | 0.161 | |
| H | 0.20 | V: 0.30, Zr: 0.040 | | 1.4875 | 0.161 | |
| I | 0.20 | | Ca: 0.0010, REM: 0.0008 | 1.3675 | 0.160 | |
| J | 0.25 | | | 1.4280 | 0.160 | |
| K | | Cr: 0.3 | | 1.3225 | 0.166 | |
| L | | | Mg: 0.0021 | 1.3855 | 0.171 | |
| M | 0.25 | Cr: 0.20 | | 1.2920 | 0.177 | |
| N | 0.18 | | Ca: 0.0006, REM: 0.0010 | 1.3330 | 0.170 | COMPARATIVE EXAMPLE |
| O | 0.21 | Zr: 0.001 | | 1.3175 | <u>0.198</u> | |
| P | 0.60 | | REM: 0.0010 | <u>1.5540</u> | 0.177 | |
| Q | | | | <u>1.2195</u> | 0.165 | |
| R | | Cr: 0.60 | | 1.4740 | 0.187 | |

Each of these steel billets was used to be heated to the heating temperature of hot rolling shown in Table 2, and at the reduction ratio of the hot rolling at 900° C. or lower shown in rolling ends. Each underline means that the value is out of the range of the present invention. Further, the plate thickness is the plate thickness at the time of welding before expansion.

TABLE 2

| MANUFAC-TURING No. | STEEL TYPE | HEATING TEMPERATURE ° C. | REDUCTION RATIO | WATER COOLING STOP TEMPERATURE ° C. | PLATE THICKNESS mm | INNER SURFACE WELD HEAT INPUT kJ/cm | OUTER SURFACE WELD HEAT INPUT kJ/cm | Ji-1.75t | Jo-2.42t | NOTE |
|---|---|---|---|---|---|---|---|---|---|---|
| 1 | A | 1000 | 3.7 | 260 | 30 | 56 | 67 | 3.5 | −5.6 | PRESENT |
| 2 | B | 1020 | 3.4 | 450 | 36 | 71 | 93 | 8.0 | 5.9 | INVENTION |
| 3 | C | 1130 | 4.3 | 350 | 27 | 65 | 85 | 17.8 | 19.7 | EXAMPLE |
| 4 | D | 1080 | 3.3 | 320 | 30 | 56 | 66 | 3.5 | −6.6 | |
| 5 | E | 1000 | 3.5 | 420 | 38 | 66 | 83 | −0.5 | −9.0 | |
| 6 | F | 960 | 2.3 | 595 | 25 | 58 | 72 | 14.3 | 11.5 | |
| 7 | G | 1025 | 4.2 | 400 | 39 | 67 | 105 | −1.3 | 10.6 | |
| 8 | H | 1050 | 3.6 | 480 | 32 | 73 | 92 | 17.0 | 14.6 | |
| 9 | I | 1035 | 3.8 | 430 | 30 | 55 | 64 | 2.5 | −8.6 | |
| 10 | J | 1040 | 3.6 | 420 | 29 | 52 | 66 | 1.3 | −4.2 | |
| 11 | K | 1040 | 3.6 | 430 | 29 | 53 | 68 | 2.3 | −2.2 | |
| 12 | L | 1040 | 3.6 | 420 | 29 | 53 | 67 | 2.3 | −3.2 | |
| 13 | M | 970 | 4.5 | 580 | 26 | 44 | 71 | −1.5 | 8.1 | |
| 14 | N | 1150 | 3.5 | 350 | 32 | 60 | 72 | 4.0 | −5.4 | COMPARATIVE |
| 15 | O | 1050 | 2.5 | 350 | 32 | 60 | 72 | 4.0 | −5.4 | EXAMPLE |
| 16 | P | 1050 | 3.5 | 450 | 32 | 60 | 72 | 4.0 | −5.4 | |
| 17 | Q | 1050 | 3.5 | 450 | 32 | 60 | 72 | 4.0 | −5.4 | |
| 18 | R | 1050 | 3.5 | 450 | 32 | 60 | 72 | 4.0 | −5.4 | |
| 19 | G | 1050 | 3.5 | 450 | 32 | 43 | 65 | −13.0 | −12.4 | |
| 20 | G | 1050 | 3.5 | 450 | 32 | 92 | 105 | 36.0 | 27.6 | |

Next, each of the obtained base material steel plates was formed into a pipe shape by the UO process, and edge portions of the base material steel plate were butted and submerged arc welding was performed from an inner surface of the base material steel plate with heat input shown in Table 2, and then the submerged arc welding was performed from an outer surface of the base material steel plate with heat input shown in Table 2, and thereby the base material steel plate was seam welded. Each of obtained thick welded steel pipes was expanded, and the thick welded steel pipes in Manufacturing No. 1 to 20 each having an outside diameter of 1016 mm were obtained. Among the thick welded steel pipes in Manufacturing No. 1 to 20, Manufacturing No. 1 to 13 are the present invention examples, and Manufacturing No. 14 to 20 are the comparative examples.

In the submerged arc welding, there was used a welding wire having a chemical composition containing, in mass %, C: 0.01 to 0.12%, Si: 0.05 to 0.5%, Mn: 1.0 to 2.5%, Al: 0.1% or less, Ti: 0.05% or less, and further containing, as needed, Ni: 2.0 to 8.5% and one type or two types or more of Cr, Mo, and V in a range of Cr+Mo+V: 1.0 to 5.0%, and containing B: 0.0001 to 0.005%, and a balance being composed of Fe and inevitable impurities, in consideration of the dilution by the base material steel plate.

Samples were obtained from weld metals of the thick welded steel pipes in Manufacturing No. 1 to 20, and were each subjected to component analysis, and results of the component analysis are shown in Table 3.

TABLE 3

| MANUFAC-TURING No. | PLATE TYPE | WELD METAL COMPOSITION(mass %) | | | | | | | | | | | NOTE |
|---|---|---|---|---|---|---|---|---|---|---|---|---|---|
| | | C | Si | Mn | P | S | Al | Ti | O | Ni | Cr + Mo + V | B | |
| 1 | A | 0.061 | 0.08 | 1.71 | 0.008 | 0.0037 | 0.013 | 0.010 | 0.020 | 0.72 | 0.36 | 0.0004 | PRESENT |
| 2 | B | 0.065 | 0.18 | 1.68 | 0.009 | 0.0021 | 0.016 | 0.013 | 0.017 | | 0.45 | 0.0006 | INVENTION |
| 3 | C | 0.043 | 0.13 | 1.98 | 0.009 | 0.0035 | 0.008 | 0.016 | 0.029 | 1.00 | | | EXAMPLE |
| 4 | D | 0.052 | 0.08 | 1.73 | 0.008 | 0.0022 | 0.013 | 0.020 | 0.022 | | 0.72 | 0.0039 | |
| 5 | E | 0.065 | 0.10 | 1.68 | 0.007 | 0.0024 | 0.018 | 0.004 | 0.023 | 0.35 | 0.30 | | |
| 6 | F | 0.089 | 0.12 | 1.51 | 0.009 | 0.0012 | 0.028 | 0.012 | 0.005 | 0.80 | 0.10 | 0.0010 | |
| 7 | G | 0.067 | 0.18 | 1.71 | 0.007 | 0.0007 | 0.013 | 0.018 | 0.023 | | 0.45 | | |
| 8 | H | 0.055 | 0.20 | 1.78 | 0.008 | 0.0049 | 0.018 | 0.029 | 0.001 | 0.30 | | 0.0005 | |
| 9 | I | 0.062 | 0.25 | 1.67 | 0.009 | 0.0032 | 0.008 | 0.013 | 0.018 | 0.50 | 0.25 | 0.0049 | |
| 10 | J | 0.052 | 0.24 | 1.67 | 0.009 | 0.0032 | 0.008 | 0.013 | 0.018 | 0.50 | 0.25 | 0.0049 | |
| 11 | K | 0.064 | 0.25 | 1.71 | 0.009 | 0.0032 | 0.008 | 0.012 | 0.022 | 0.40 | 0.25 | 0.0049 | |
| 12 | L | 0.071 | 0.26 | 1.78 | 0.009 | 0.0032 | 0.008 | 0.013 | 0.020 | 0.30 | 0.25 | 0.0049 | |
| 13 | M | 0.075 | 0.34 | 1.72 | 0.008 | 0.0025 | 0.002 | 0.011 | 0.016 | | 0.30 | | |
| 14 | N | 0.062 | 0.12 | 1.71 | 0.008 | 0.0023 | 0.013 | 0.011 | 0.022 | 0.30 | | 0.0011 | COMPARATIVE |
| 15 | O | 0.062 | 0.11 | 1.68 | 0.008 | 0.0032 | 0.009 | 0.013 | 0.020 | | 0.45 | 0.0004 | EXAMPLE |
| 16 | P | 0.063 | 0.13 | 1.70 | 0.009 | 0.0012 | 0.014 | 0.012 | 0.018 | 0.30 | 0.21 | | |
| 17 | Q | 0.061 | 0.08 | 1.65 | 0.010 | 0.0022 | 0.016 | 0.012 | 0.019 | 0.10 | | | |
| 18 | R | 0.058 | 0.12 | 1.58 | 0.012 | 0.0026 | 0.013 | 0.011 | 0.022 | | | 0.0003 | |
| 19 | G | 0.067 | 0.18 | 1.71 | 0.007 | 0.0007 | 0.013 | 0.018 | 0.023 | | 0.45 | | |
| 20 | G | 0.067 | 0.18 | 1.71 | 0.007 | 0.0007 | 0.013 | 0.018 | 0.023 | | 0.45 | | |

V-notch test pieces were made from the thick welded steel pipes in Manufacturing No. 1 to 20 based on JIS Z 3128, and were subjected to a Charpy impact test at −60° C. based on JIS Z 2242, and thereby Charpy absorbed energy of each coarse-grained HAZ (toughness at −60° C. of each coarse-grained HAZ) was obtained. Results thereof are shown in Table 4. Note that the V-notch test piece with its longitudinal direction corresponding to the circumferential direction of the thick welded steel pipe was obtained from the base material steel plate at the position of 2 mm down in the plate thickness direction from the surface being the side that was welded later (the outer surface). Further, similarly to the V-notch test piece 15 shown in FIG. 4, a V-notch 16 in a V-notch test piece 15 was provided so as to cross a weld fusion line 3 at a middle portion of the bottom of the V-notch 16. Incidentally, in Table 4, each underline means that the value is out of the range of the present invention.

Figure 6:
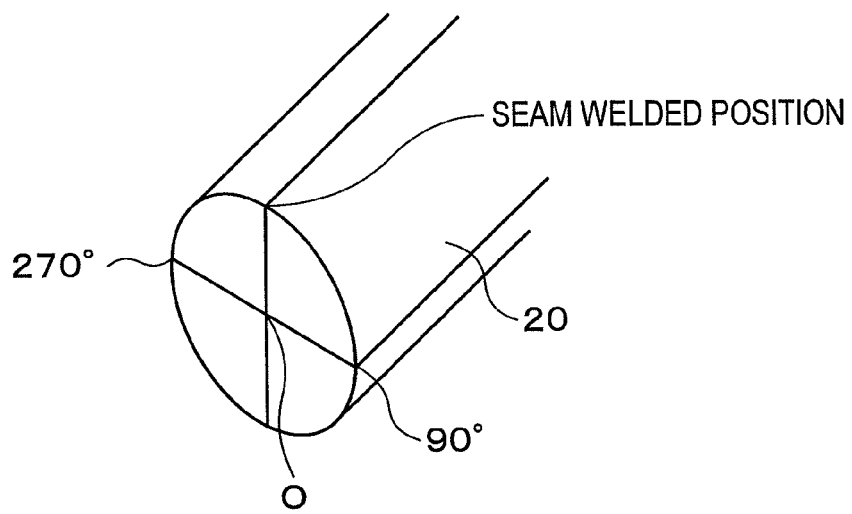
FIG. 6 is a view for explaining a position from which a round bar test piece is obtained.

Each round bar test piece with its longitudinal direction corresponding to the circumferential direction of the steel pipe was obtained from the thick welded steel pipes in Manufacturing No. 1 to 20, and the yield strength in the tensile direction corresponding to the circumferential direction of the base material steel plate (the yield strength of the base material steel plate) was obtained. As shown in FIG. 6, the position from which the round bar test piece was obtained was set to the middle position of the thickness of the base material steel plate (the position of t/2 with respect to the thickness t) of a portion 90° or 270° apart in the circumferential direction from the seam welded position about a center O of the cross section of the thick welded steel pipe 20 as a rotation axis, and

TABLE 4

| MANUFAC TURING No. | PLATE TYPE | METAL STRUCTURE OF BASE MATERIAL | | | | METAL STRUCTURE OF COARSE-GRAINED HEAT AFFECTED ZONE AREA RATIO (%) | |
|---|---|---|---|---|---|---|---|
| | | AREA RATIO (%) | | | FERRITE GRAIN SIZE (μm) | GRAIN BOUNDARY FERRITE | INTRA GRANULAR FERRITE |
| | | FERRITE | MA | BAINITE | | | |
| 1 | A | 75 | 6 | 19 | 7.5 | 4.9 | 19.6 |
| 2 | B | 81 | 2 | 17 | 10.1 | 11.4 | 33.2 |
| 3 | C | 73 | 5 | 22 | 4.2 | 6.9 | 15.2 |
| 4 | D | 72 | 8 | 20 | 13.7 | 4.1 | 7.8 |
| 5 | E | 78 | 3 | 19 | 13.5 | 12.9 | 51.9 |
| 6 | F | 81 | 2 | 17 | 16.4 | 7.8 | 18.2 |
| 7 | G | 78 | 5 | 17 | 3.2 | 14.8 | 42.7 |
| 8 | H | 78 | 3 | 19 | 7.8 | 5.6 | 39.0 |
| 9 | I | 82 | 3 | 15 | 6.6 | 1.7 | 19.2 |
| 10 | J | 77 | 3 | 20 | 8.2 | 3.5 | 18.0 |
| 11 | K | 80 | 4 | 16 | 7.7 | 4.1 | 16.5 |
| 12 | L | 81 | 5 | 14 | 8.8 | 3.3 | 17.3 |
| 13 | M | 80 | 4 | 16 | 4.6 | 1.5 | 48.5 |
| 14 | N | 71 | 7 | 22 | 13.6 | 3.0 | 4.8 |
| 15 | O | 80 | 3 | 17 | 16.8 | 12.5 | <u>0</u> |
| 16 | P | 87 | 6 | 7 | 13.4 | <u>1.3%</u> | 5.2 |
| 17 | Q | 81 | 3 | 16 | 13.5 | <u>0.6%</u> | 18.3 |
| 18 | R | 82 | 5 | 13 | 13.8 | 11.8 | <u>0</u> |
| 19 | G | 78 | 5 | 17 | 3.2 | <u>0</u> | 18.3 |
| 20 | G | 78 | 5 | 17 | 3.2 | <u>0</u> | 15.2 |

| MANUFAC TURING No. | METAL STRUCTURE OF COARSE-GRAINED HEAT AFFECTED ZONE AREA RATIO (%) | | | BASE MATERIAL YIELD STRENGTH (MPa) | COARSE-GRAINED HEAT AFFECTED ZONE TOUGHNESS −60° C. (J) | NOTE |
|---|---|---|---|---|---|---|
| | MA | BAINITE | LATH-SHAPED BAINITE | | | |
| 1 | 1.8 | 73.7 | 4.5 | 533 | 102 | PRESENT |
| 2 | 2.5 | 52.9 | 5.5 | 485 | 245 | INVENTION |
| 3 | 2.3 | 75.6 | 9.4 | 581 | 97 | EXAMPLE |
| 4 | 4.9 | 83.2 | 5.7 | 548 | 85 | |
| 5 | 6.9 | 28.3 | 17.2 | 476 | 88 | |
| 6 | 2.3 | 71.7 | 10.5 | 454 | 105 | |
| 7 | 5.6 | 36.9 | 19.7 | 448 | 185 | |
| 8 | 5.1 | 50.3 | 7.6 | 483 | 225 | |
| 9 | 2.4 | 76.6 | 2.6 | 492 | 235 | |
| 10 | 3.3 | 75.2 | 3.5 | 550 | 95 | |
| 11 | 2.2 | 77.2 | 3.8 | 534 | 105 | |
| 12 | 1.1 | 78.3 | 4.2 | 520 | 133 | |
| 13 | 6.4 | 43.7 | 2.3 | 467 | 135 | |
| 14 | <u>12.3</u> | 79.9 | 18.2 | 488 | 12 | COMPARATIVE |
| 15 | 9.5 | 78.0 | 21.5 | <u>655</u> | 18 | EXAMPLE |
| 16 | 9.8 | 85.0 | 18.3 | 592 | 8 | |
| 17 | 6.8 | 74.9 | 8.2 | 483 | 7 | |
| 18 | <u>14.3</u> | 73.9 | 16.1 | 467 | 11 | |
| 19 | 8.9 | 72.8 | 11.3 | 448 | 7 | |
| 20 | <u>14.3</u> | 70.5 | 10.7 | 448 | 4 | | the diameter of a parallel portion of the round bar test piece was set to 6 mm. Results of the yield strength are shown in Table 4.

Each of microstructures of plate thickness middle portions of the base material steel plates of the thick welded steel pipes in Manufacturing No. 1 to 20 was observed by an optical microscope to measure area ratios of ferrite, bainite, and MA and confirm the balance structure. The grain size of the ferrite was also measured with an optical microscope. Results thereof are shown in Table 4. The grain size of the ferrite of the base material steel plate is the mean value of the grain sizes measured by an intercept method on cross sections perpendicular to the steel plate front surface (the welded steel pipe front surface) and parallel to the longitudinal direction of the steel pipe (L cross sections) at positions of t/4 and 3t/4 with respect to the thickness t of the portion 90° or 270° apart in the circumferential direction from the seam welded position.

Each small piece was obtained from the vicinities of the weld metals of the thick welded steel pipes in Manufacturing No. 1 to 20, and a metal structure of the coarse-grained heat affected zone was observed by an optical microscope to measure area ratios of ferrite, bainite, and MA formed on a prior austenite grain boundary and in a prior austenite grain. Further, an area ratio of lath-shaped bainite was also measured by an optical microscope. Results thereof are shown in Table 4.

In Manufacturing No. 1 to 13, the metal structure of the base material steel plate contains ferrite being 30 to 95% in an area ratio with the grain sizes of 15 μm or less, and bainite, the metal structure of the coarse-grained HAZ contains grain boundary ferrite being 0.1% or more in an area ratio and intragranular ferrite being 0.5% or more in an area ratio, and the total of the area ratios of the grain boundary ferrite and the intragranular ferrite is 90% or less, an area ratio of a mixed structure of martensite and austenite (MA) is 10% or less, and its balance is composed of bainite, and the yield strength in the tensile direction corresponding to the circumferential direction of the base material steel plate is 635 MPa or less, and the absorbed energy of the coarse-grained HAZ at −60° C. is 60 J or more, and the low temperature toughness is excellent.

In Manufacturing No. 14, the content of Si of the base material steel plate is large, and thus MA in excess of 10% in an area ratio is formed in the coarse-grained HAZ, resulting in that the low temperature toughness of the coarse-grained HAZ is decreased.

Manufacturing No. 15 is an example where the Pcm is high, the strength is too high, and thus intragranular ferrite is not formed in the coarse-grained HAZ, resulting in that the low temperature toughness of the coarse-grained HAZ is decreased.

Manufacturing No. 16 is an example where the balance of Mn and Mo exceeds the upper limit of (Expression 1). On the other hand, Manufacturing No. 17 is an example where the balance of Mn and Mo does not satisfy the lower limit of (Expression 1). In both Manufacturing No. 16 and 17, (Expression 1) is not satisfied, so that grain boundary ferrite is not formed 1.5% or more in the coarse-grained HAZ and thus the low temperature toughness of the coarse-grained HAZ is decreased.

Manufacturing No. 18 is an example where the amount of Al is excessive, and thus no intragranular ferrite is formed in the coarse-grained HAZ and MA in excess of 10% in an area ratio is formed in the coarse-grained HAZ, resulting in that the low temperature toughness of the coarse-grained HAZ is decreased.

Manufacturing No. 19 is an example where the heat input of the submerged arc welding is small, and no grain boundary ferrite is formed in the coarse-grained heat affected zone, and thus the low temperature toughness of the coarse-grained HAZ is decreased.

On the other hand, Manufacturing No. 20 is an example where the heat input of the submerged arc welding is large, and no grain boundary ferrite is formed in the coarse-grained HAZ and MA in excess of 10% in an area ratio is formed in the coarse-grained HAZ, resulting in that the low temperature toughness of the coarse-grained HAZ is decreased.

Figure 7:
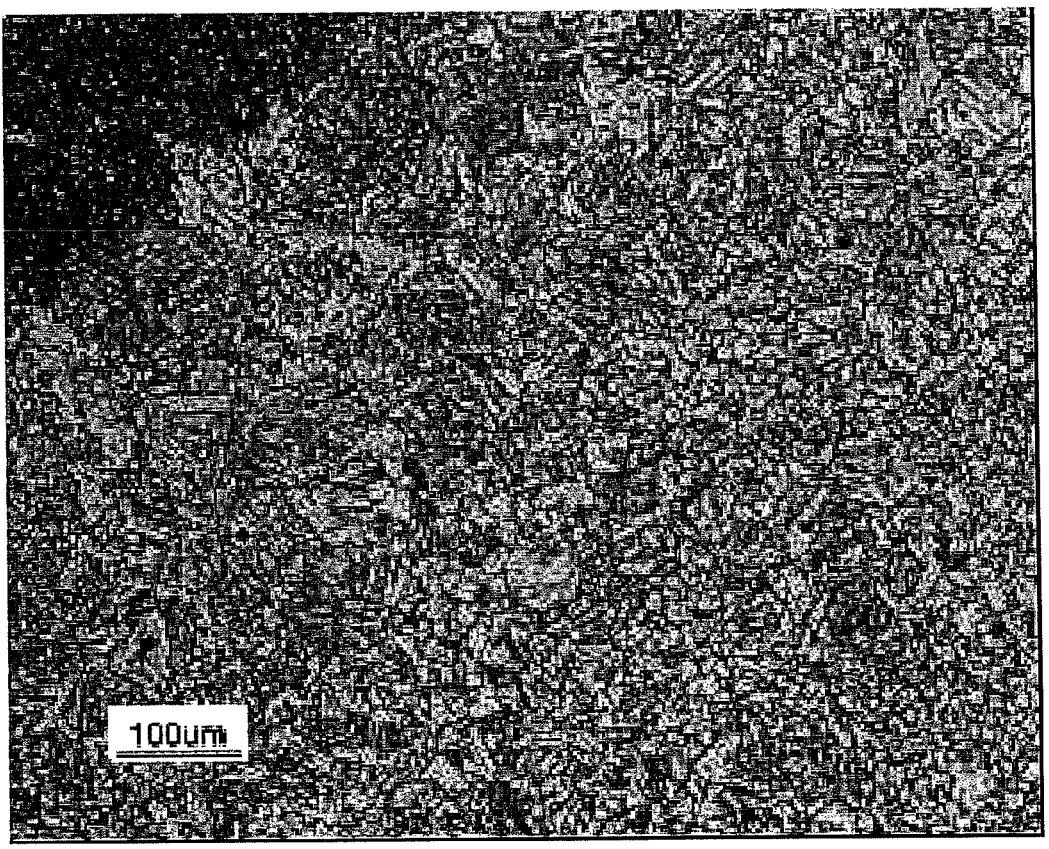
FIG. 7 is a photograph showing a metal structure of a coarse-grained HAZ of a present invention example.
Figure 8:
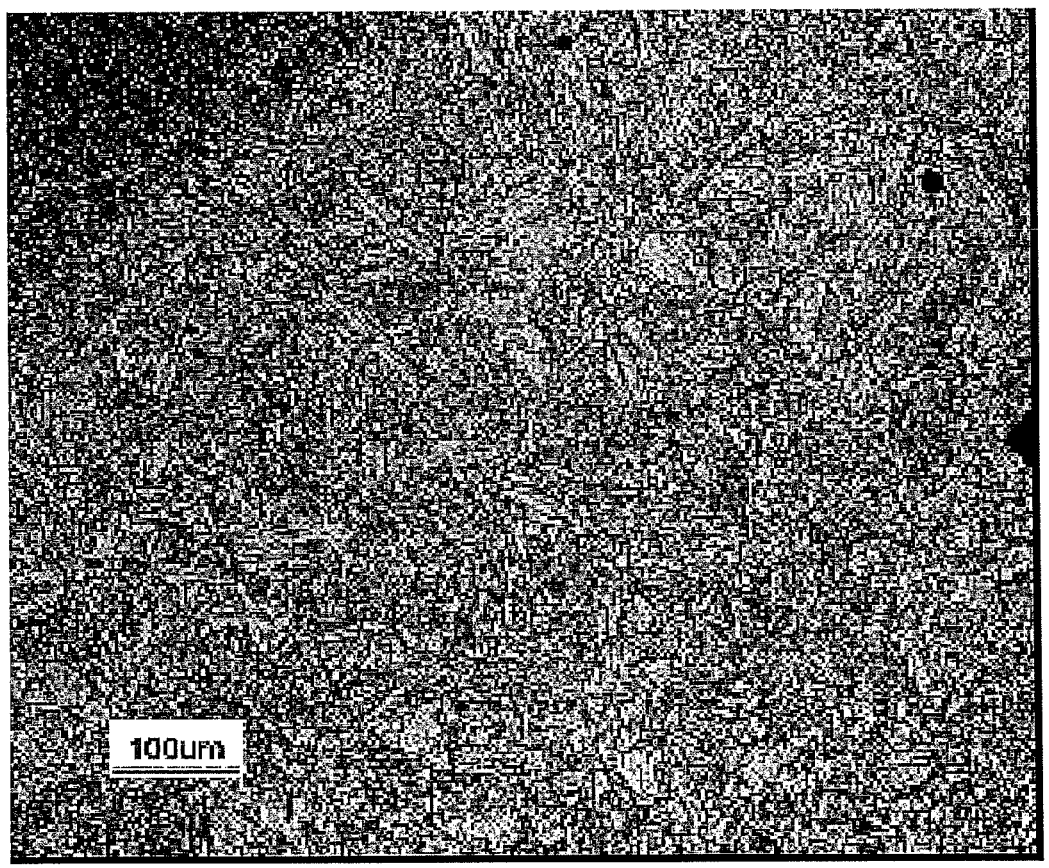
FIG. 8 is a photograph showing a metal structure of a coarse-grained HAZ of a comparative example.
Figure 9:
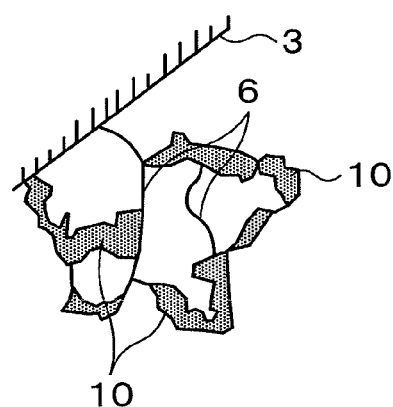
FIG. 9 is a schematic view of the metal structure in FIG. 7.
Figure 10:
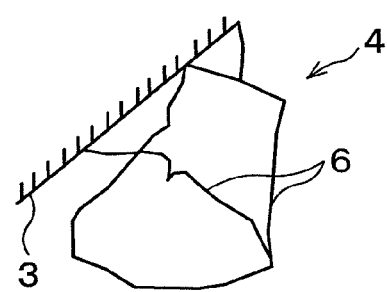
FIG. 10 is a schematic view of the metal structure in FIG. 8.

FIG. 7 is a photograph showing the metal structure of the coarse-grained HAZ of the small piece which is obtained in the proximity of the weld metal of the thick welded steel pipe in Manufacturing No. 1 and is observed by an optical microscope. FIG. 8 is a photograph showing the metal structure of the coarse-grained HAZ of the small piece which is obtained in the proximity of the weld metal of the thick welded steel pipe in Manufacturing No. 17 and is observed by an optical microscope. As shown in FIG. 9, in the present invention example of Manufacturing No. 1, in the coarse-grained HAZ, grain boundary ferrite 10 was formed on prior austenite grain boundaries 6 and the prior austenite grain boundaries 6 were unclear. On the other hand, as shown in FIG. 10, in the comparative example of Manufacturing No. 17, in the coarse-grained HAZ, grain boundary ferrite 10 was not formed on prior austenite grain boundaries 6 and the prior austenite grain boundaries 6 were clear.

EXPLANATION OF CODES

1 Outer Surface Weld Metal
2 Inner Surface weld Metal
3 Weld Fusion Line
4 Coarse-Grained HAZ
5 HAZ
6 Prior Austenite Grain Boundary
7 Lath-Shaped Bainite
8 MA
9 MA to be an Origin of Fracture
10 Grain Boundary Ferrite
11 Intragranular Ferrite
15 V-notch Test Piece
16 V-notch
20 Thick Welded Steel Pipe

What is claimed:

1. A thick welded steel pipe excellent in low temperature toughness having a thickness of 25 to 45 mm that is formed of a base material steel sheet formed into a pipe shape being seam welded and has a coarse-grained HAZ, wherein
the base material steel sheet has a component composition containing, in mass %,
C: 0.03% to 0.085%,
Mn: 1.45% to 1.85%,
Ti: 0.005 to 0.020%,
Nb: 0.005 to 0.050%, and
O: 0.0005 to 0.005%, and
Si: limited to 0.15% or less,
Al: limited to 0.015% or less,
P: limited to 0.02% or less,
S: limited to 0.005% or less, and
Mo: limited to 0.20% or less, and
having the contents of Mn and Mo satisfying (Expression 1) below, a Pcm obtained by (Expression 2) below being 0.16 to 0.19, and a balance being composed of Fe and inevitable impurities,
a metal structure of the base material steel sheet consists of ferrite being 30 to 95% in an area ratio and a low temperature transformation structure, and in a metal structure of the coarse-grained HAZ, an area ratio of grain boundary ferrite is 1.5% or more, the total area ratio of the grain boundary ferrite and intragranular ferrite is not less than 11% nor more than 90%, an area ratio of MA is 10% or less, and its balance is composed of bainite:

$$1.2325 \leq (0.85 \times [Mn]-[Mo]) \leq 1.5215 \quad \text{(Expression 1)}$$

$$Pcm=[C]+[Si]/30+([Mn]+[Cu]+[Cr])/20+[Ni]/60+[Mo]/15+[V]/10 \quad \text{(Expression 2)}$$

In (Expression 2), [C], [Si], [Mn], [Cu], [Cr], [Ni], [Mo], and [V] denote the contents of C, Si, Mn, Cu, Cr, Ni, Mo, and V [mass %] respectively.

2. The thick welded steel pipe excellent in low temperature toughness according to claim 1, wherein
a grain size of the ferrite in the metal structure of the base material steel sheet is 2 to 15 μm.

3. The thick welded steel pipe excellent in low temperature toughness according to claim 1, wherein
the bainite in the metal structure of the coarse-grained HAZ consists of lath-shaped bainite and massive bainite, and an area ratio of the lath-shaped bainite is 20% or less.

4. The thick welded steel pipe excellent in low temperature toughness according to claim 1, wherein
the base material steel sheet further contains one or both of, in mass %,
Cu: 0.70% or less, and
Ni: 0.70% or less.

5. The thick welded steel pipe excellent in low temperature toughness according to claim 1, wherein
the base material steel sheet further contains one type or two types or more of, in mass %,
Cr: 1.00% or less,
V: 0.10% or less,
Zr: 0.050% or less, and
Ta: 0.050% or less.

6. The thick welded steel pipe excellent in low temperature toughness according to claim 1, wherein
the base material steel sheet further contains one type or two types or more of, in mass %,
Mg: 0.0100% or less,
Ca: 0.0050% or less, and
REM: 0.0050% or less.

7. The thick welded steel pipe excellent in low temperature toughness according to claim 1, wherein
yield strength in a tensile direction corresponding to a circumferential direction of the thick welded steel pipe is 400 to 635 MPa, and Charpy absorbed energy of the coarse-grained HAZ at −60° C. is 60 J or more.

8. The thick welded steel pipe excellent in low temperature toughness according to claim 1, wherein
a weld metal of the thick welded steel pipe contains, in mass %
C: 0.04% to 0.09%,
Si: 0.01% to 0.35%,
Mn: 1.5% to 2.0%,
Al: 0.002% to 0.030%,
Ti: 0.003% to 0.030%, and
O: 0.0005% to 0.030%, and
P: limited to 0.02% or less, and
S: limited to 0.005% or less, and further contains one type or two types or more of, in mass %,
Ni: 0.2% to 1.0%,
Cr+Mo+V: 0.2% to 1.0%, and
B: 0.0001 to 0.0050%, and a balance being composed of Fe and inevitable impurities.

9. A manufacturing method of a thick welded steel pipe excellent in low temperature toughness having a thickness of 25 to 45 mm comprising:
forming a base material steel sheet obtained in a manner that a steel having a component composition containing, in mass %,
C: 0.03% to 0.085%,
Mn: 1.45% to 1.85%,
Ti: 0.005 to 0.020%,
Nb: 0.005 to 0.050%, and
O: 0.0005 to 0.005%, and
Si: limited to 0.15% or less,
Al: limited to 0.015% or less,
P: limited to 0.02% or less,
S: limited to 0.005% or less, and
Mo: limited to 0.20% or less, and
having the contents of Mn and Mo satisfying (Expression 1) below, a Pcm obtained by (Expression 2) below being 0.16 to 0.19, and a balance being composed of Fe and inevitable impurities is cast, an obtained steel billet is heated to 950 to 1150° C., is subjected to hot rolling at an end temperature of $Ar_3$ or higher, and is water-cooled down to 600° C. or lower, into a pipe shape; and
when end portions of the base material steel sheet being butted to be seam welded by submerged arc welding from an inner surface and outer surface of the base material steel sheet, seam welding the end portions of the base material steel sheet such that heat input $J_I$ [kJ/cm] of the submerged arc welding from the inner surface, heat input $J_O$ [kJ/cm] of the submerged arc welding from the outer surface, and a sheet thickness t [mm] satisfy relationships of (Expression 3) and (Expression 4) below:

$$1.2325 \leq (0.85 \times [Mn]-[Mo]) \leq 1.5215 \quad \text{(Expression 1)}$$

$$Pcm=[C]+[Si]/30+([Mn]+[Cu]+[Cr])/20+[Ni]/60+[Mo]/15+[V]/10 \quad \text{(Expression 2)}$$

where [C], [Si], [Mn], [Cu], [Cr], [Ni], [Mo], and [V] denote the contents of C, Si, Mn, Cu, Cr, Ni, Mo, and V [mass %] respectively:

$$-2.3 \leq J_I-1.75 \, t \leq 27.8 \quad \text{(Expression 3)}$$

$$-9.6 \leq J_O-2.42 \, t \leq 20.6 \quad \text{(Expression 4).}$$

10. The manufacturing method of the thick welded steel pipe excellent in low temperature toughness according to claim 9, wherein
the hot rolling is performed at a rolling ratio at 900° C. or lower set as 2.0 or more.

11. The manufacturing method of the thick welded steel pipe excellent in low temperature toughness according to claim 9, wherein
a process of said forming the base material steel sheet into a pipe shape is a UO process in which the base material steel sheet is formed into a C shape, a U shape, and an O shape in order, the manufacturing method of the thick welded steel pipe excellent in low temperature toughness further comprising:
expanding the thick welded steel pipe obtained after said seam welding the end portions of the base material steel sheet.

12. A steel sheet for a thick welded steel pipe used for manufacturing a thick welded steel pipe and having a thickness of 25 to 45 mm, the steel sheet for the thick welded steel pipe comprising:

a component composition containing, in mass %,
C: 0.03% to 0.085%,
Mn: 1.45% to 1.85%,
Ti: 0.005 to 0.020%,
Nb: 0.005 to 0.050%, and
O: 0.0005 to 0.005%, and
Si: limited to 0.09% or less,
Al: limited to 0.009% or less,
P: limited to 0.02% or less,
S: limited to 0.005% or less, and
Mo: limited to 0.20% or less, and
having the contents of Mn and Mo satisfying (Expression 1) below, a Pcm obtained by (Expression 2) below being 0.16 to 0.19, and a balance being composed of Fe and inevitable impurities,
a metal structure consists of ferrite being 30 to 95% in an area ratio and a low temperature transformation structure, $$1.2325 \leq (0.85 \times [Mn] - [Mo]) \leq 1.5215 \quad \text{(Expression 1)}$$

$$Pcm = [C] + [Si]/30 + ([Mn] + [Cu] + [Cr])/20 + [Ni]/60 + [Mo]/15 + [V]/10 \quad \text{(Expression 2)}$$

In (Expression 2), [C], [Si], [Mn], [Cu], [Cr], [Ni], [Mo], and [V] denote the contents of C, Si, Mn, Cu, Cr, Ni, Mo, and V [mass %] respectively.

13. The steel sheet for the thick welded steel pipe according to claim 12 wherein,
a grain size of ferrite in the metal structure is 2 to 15 μm.

\* \* \* \* \*